US011508383B2

(12) United States Patent
Kim et al.

(10) Patent No.: US 11,508,383 B2
(45) Date of Patent: Nov. 22, 2022

(54) METHOD FOR OPERATING CONTENT AND ELECTRONIC DEVICE FOR IMPLEMENTING SAME

(71) Applicant: Samsung Electronics Co., Ltd., Suwon-si (KR)

(72) Inventors: Sunok Kim, Seoul (KR); Sung-Woon Jang, Hwaseong-si (KR); Sung-Hwan Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 624 days.

(21) Appl. No.: 16/471,968

(22) PCT Filed: Sep. 20, 2017

(86) PCT No.: PCT/KR2017/010289
§ 371 (c)(1),
(2) Date: Jun. 20, 2019

(87) PCT Pub. No.: WO2018/117376
PCT Pub. Date: Jun. 28, 2018

(65) Prior Publication Data
US 2019/0333523 A1 Oct. 31, 2019

(30) Foreign Application Priority Data

Dec. 21, 2016 (KR) .......................... 10-2016-0175412

(51) Int. Cl.
*G10L 17/24* (2013.01)
*G06F 21/60* (2013.01)
(Continued)

(52) U.S. Cl.
CPC .............. *G10L 17/24* (2013.01); *G06F 21/32* (2013.01); *G06F 21/602* (2013.01); *G10L 15/06* (2013.01); *G10L 17/00* (2013.01)

(58) Field of Classification Search
CPC ......... G10L 17/24; G10L 15/04; G10L 15/26; G10L 15/06; G10L 17/00; G10L 15/07;
(Continued)

(56) References Cited

U.S. PATENT DOCUMENTS 8,543,834 B1 *   9/2013 Barra ...................... G06F 21/32
                                                                    726/16
9,723,000 B1 *   8/2017 Daniel .................... G06F 21/32
(Continued)

FOREIGN PATENT DOCUMENTS

JP      2011-216031 A      10/2011
KR      10-0968190 B1       7/2010
(Continued)

*Primary Examiner* — Linda Wong
(74) *Attorney, Agent, or Firm* — Jefferson IP Law, LLP

(57) ABSTRACT

Various embodiments provide an electronic device and a method therefor, the electronic device comprising: a voice recognition unit; a memory; a display; and a processor functionally connected to the voice recognition unit, the memory or the display, wherein the processor is configured to: acquire password information for the content selected by a user, when the voice information of a user recognized by the voice recognition unit includes a hidden command; request the user to articulate the obtained password information; and encrypt the content based on the received voice information according to the request. In addition, other embodiments are possible.

18 Claims, 13 Drawing Sheets

(51) Int. Cl.
*G10L 15/06* (2013.01)
*G10L 17/00* (2013.01)
*G06F 21/32* (2013.01)

(58) Field of Classification Search
CPC ... G10L 25/51; G10L 15/00; G10L 2015/088; G10L 15/20; G10L 15/02; G06F 21/32; G06F 21/602; G06F 21/6209; G06F 3/167
See application file for complete search history.

(56) References Cited

U.S. PATENT DOCUMENTS

| | | | |
|---|---|---|---|
| 2006/0230072 A1* | 10/2006 | Partovi | G06Q 10/06 |
| 2007/0038868 A1* | 2/2007 | Yu | H04L 9/3231 |
| | | | 704/E17.007 |
| 2010/0281254 A1 | 11/2010 | Carro et al. | |
| 2012/0096542 A1* | 4/2012 | Shea | G06F 21/34 |
| | | | 726/16 |
| 2012/0210402 A1* | 8/2012 | Holvey | G06F 21/6272 |
| | | | 726/5 |
| 2015/0269389 A1 | 9/2015 | Lee | |
| 2015/0379252 A1 | 12/2015 | Tang et al. | |
| 2016/0269178 A1 | 9/2016 | Yang et al. | |
| 2016/0359874 A1* | 12/2016 | Black | H04W 12/069 |

FOREIGN PATENT DOCUMENTS

| | | | |
|---|---|---|---|
| KR | 10-1052294 B1 | 7/2011 | |
| KR | 10-2015-0110400 A | 10/2015 | |
| KR | 10-2016-0011612 A | 2/2016 | |
| WO | WO-2016149679 A1 * | 9/2016 | ......... G06F 21/6209 |

* cited by examiner

METHOD FOR OPERATING CONTENT AND ELECTRONIC DEVICE FOR IMPLEMENTING SAME

TECHNICAL FIELD

Various embodiments relate to a method and a device for operating content.

BACKGROUND ART

With the development of digital technology in recent years, various types of electronic devices, such as a mobile communication terminal, a personal digital assistant (PDA), an electronic organizer, a smartphone, a tablet personal computer (PC), and a wearable device, are being widely used. The hardware and/or software aspects of electronic devices are continuously being improved in order to support and enhance functions. For example, an electronic device includes a fingerprint recognition sensor or an iris recognition sensor to enhance a security function.

Further, electronic devices provide various services (or functions) using voice recognition technology. Voice recognition technology may include, for example, a technique for converting an acoustic speech signal obtained by an electronic device through a sound sensor, such as a microphone, into a word or a sentence. In voice recognition technology, an operation of extracting a sound signal and removing noise is generally performed, and then the characteristics of a voice signal are extracted and compared with a speech model database (DB), thereby performing voice recognition. Electronic devices provide various voice services (or voice recognition services) based on voice recognition technology. According to one embodiment, an electronic device provides a variety of daily convenience services, such as mobile search, scheduling, making a call, taking a note, or playing music, based on a user's voice command.

DISCLOSURE OF INVENTION

Technical Problem

A content hide (lock or encrypt) function provided by each application of an electronic device is for setting whether to apply a hide function to selected content. For example, a user may set (e.g., turn on) or may not set (e.g., turn off) the hide function. A common password may be used to access hidden content. That is, to identify even one piece of content, it is necessary to decrypt all content of an encrypted application. Further, when there is encrypted content, an electronic device or an application provides a function enabling the user to visually identify the content. Thus, once knowing a password or a secrete pattern for the encrypted content, a non-user can access the encrypted content, resulting in the encrypted content being easily exposed to the non-user.

Various embodiments may provide a method and a device for easily operating content using a user's voice.

Solution to Problem

An electronic device according to various embodiments may include: a voice recognizer; a memory; a display; and a processor configured to be functionally connected to the voice recognizer, the memory, or the display, wherein the processor may be configured to: obtain password information about content selected by a user when voice information about the user recognized by the voice recognizer includes a hide instruction; request the user articulate the obtained password information; and encrypt the content based on voice information received according to the request.

An operating method of an electronic device including a voice recognizer according to various embodiments may include: recognizing voice information about a user using the voice recognizer; obtaining password information about content selected by the user when the recognized voice information includes a hide instruction; requesting the user to articulate the obtained password information; and encrypting the content based on voice information received according to the request.

Advantageous Effects of Invention

According to various embodiments, it is possible to generate a password based on the characteristics (e.g., attribute information, metadata, and tag information) of content and to hide the content using user voice authentication.

According to various embodiments, it is possible to access hidden content through speaker authentication using a user's voice, thereby providing security.

According to various embodiments, it is not indicated to a user that there is hidden content, thereby preventing another user from accessing the hidden content.

BEST MODE FOR CARRYING OUT THE INVENTION

Figure 1:
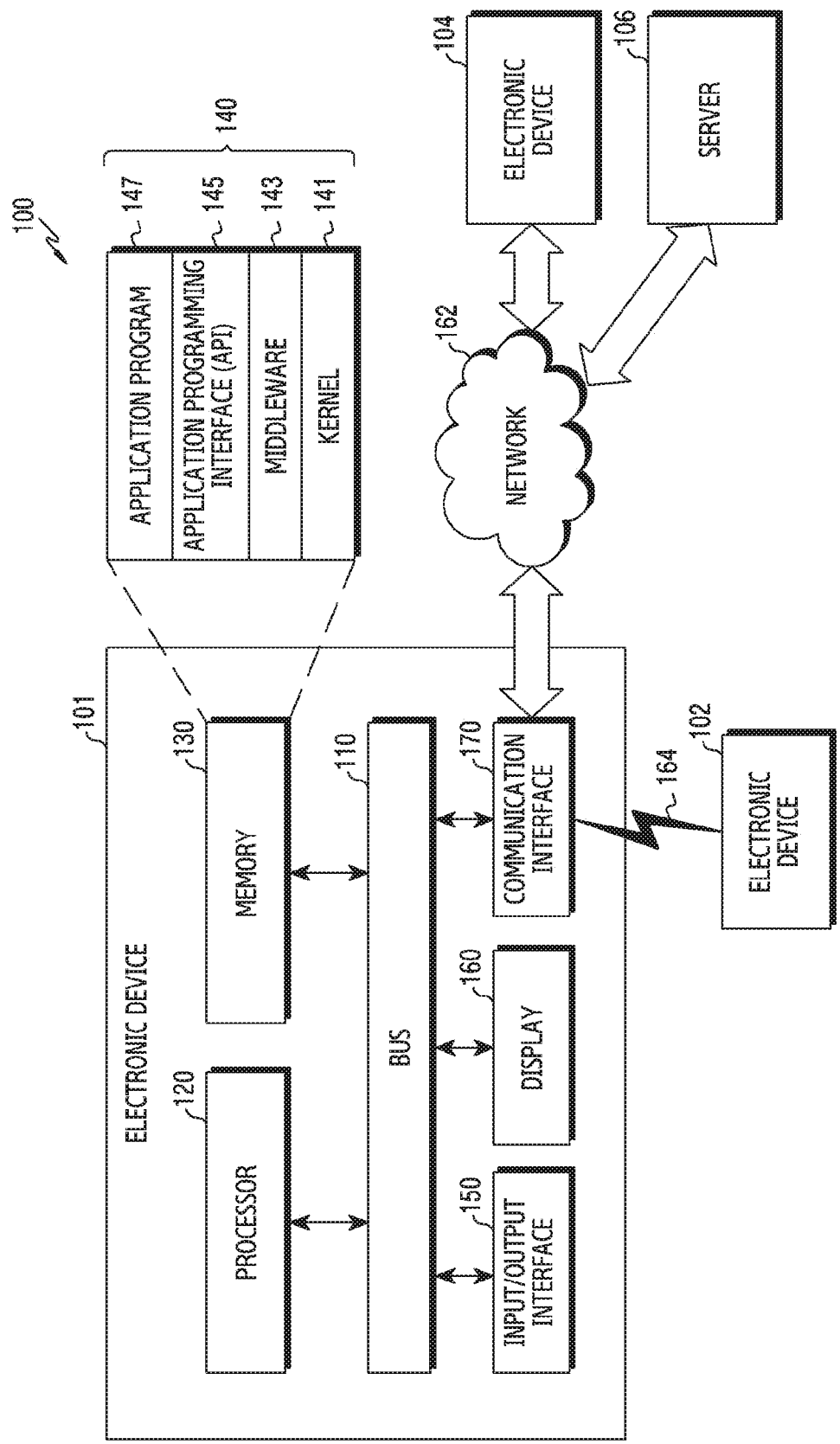
FIG. 1 illustrates an electronic device in a network environment according to various embodiments.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to the another constituent element, or be coupled through a further constituent element (e.g., a third constituent element).

The expression "configured (or set) to~," used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of ~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a network environment 100 including an electronic device, according to various embodiments of the present disclosure.

Referring to FIG. 1, the electronic device 101 may include a bus 110, a processor 120, a memory 130, an input/output interface 150, a display 160, and a communication interface 170. According to various embodiments of the present disclosure, at least one of the above elements of the electronic device 101 may be omitted from the electronic device 101, or the electronic device 101 may additionally include other elements.

The bus 110 may include a circuit that interconnects the elements 120 to 170 and delivers a communication (e.g., a control message or data) between the elements 120 to 170.

The processor 120 may include one or more of a CPU, an AP, and a communication processor (CP). The processor 120 may perform calculations or data processing related to control over and/or communication by at least one of the other elements of the electronic device 101.

The memory 130 may include a volatile memory and/or a non-volatile memory. The memory 130 may store commands or data related to at least one of the other elements of the electronic device 101. According to an embodiment of the present disclosure, the memory 130 may store software and/or a program 140. The program 140 may include a kernel 141, middleware 143, an application programming interface (API) 145, and/or an application 147. At least some of the kernel 141, the middleware 143, and the API 145 may be referred to as an operating system (OS). The kernel 141 may control or manage system resources (e.g., the bus 110, the processor 120, the memory 130, etc.) used to execute operations or functions implemented by the other programs (e.g., the middleware 143, the API 145, and the application 147). Also, the kernel 141 may provide an interface capable of controlling or managing the system resources by accessing the individual elements of the electronic device 101 by using the middleware 143, the API 145, or the application 147.

The middleware 143 may serve as an intermediary that enables the API 145 or the application 147 to communicate with the kernel 141 and to exchange data therewith. Also, the middleware 143 may process one or more task requests received from the application 147 according to a priority. The middleware 143 may assign a priority, which enables the use of system resources (e.g., the bus 110, the processor 120, the memory 130, etc.) of the electronic device 101, to at least one of the applications 147, and may process the one or more task requests according to the assigned priority. The API 145 is an interface through which the application 147 controls a function provided by the kernel 141 or the middleware 143, and may include at least one interface or function (e.g., instruction) for file control, window control, image processing, character control, etc.

The input/output interface 150 may deliver a command or data, which is input from a user or an external device, to the element(s) other than the input/output interface 150 within the electronic device 101, or may output, to the user or an external device, commands, or data received from the element(s) other than the input/output interface 150 within the electronic device 101.

The display 160 may include a liquid crystal display (LCD), a light-emitting diode (LED) display, an organic light-emitting diode (OLED) display, a micro electro mechanical systems (MEMS) display, and an electronic paper display. The display 160 may display various pieces of content (e.g., text, images, videos, icons, symbols, etc.) to the user. The display 160 may include a touch screen, and may receive a touch input, a gesture input, a proximity input, or a hovering input provided by an electronic pen or a body part of the user.

The communication interface 170 may establish communication between the electronic device 101 and an external device (e.g., a first external electronic device 102, a second external electronic device 104, or a server 106). The communication interface 170 may be connected to a network 162 through wireless or wired communication, and may communicate with the external device. The types of wireless communication may include, for example, cellular communication which uses long-term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM). According to an embodiment of the present disclosure, the types of wireless communication 164 may include wireless fidelity (Wi-Fi), light fidelity (Li-Fi), Bluetooth™, Bluetooth low energy (BLE), ZigBee, near field communication (NFC), magnetic secure transmission (MST), radio frequency (RF), and body area network (BAN).

The types of wireless communication may include a GNSS. The GNSS may be a global positioning system (GPS), a global navigation satellite system (GLONASS), a Beidou navigation satellite system (Beidou), or the European global satellite-based navigation system (Galileo). Hereinafter, in the present disclosure, the term "GPS" may be used interchangeably with the term "GNSS." The types of wired communication may include a universal serial bus (USB), a high definition multimedia interface (HDMI), recommended standard 232 (RS-232), power line communication (PLC), and a plain old telephone service (POTS). The network 162 may include telecommunication networks, such as a computer network (e.g., a local area network (LAN) or a wide area network (WAN)), the Internet, and a telephone network.

Each of the first and second external electronic devices 102 and 104 may be of a type identical to or different from that of the electronic device 101. According to various embodiments of the present disclosure, all or some of operations performed by the electronic device 101 may be performed by another electronic device or multiple electronic devices (e.g., the first and second external electronic devices 102 and 104, or the server 106). When the electronic device 101 needs to perform some functions or services automatically or by a request, the electronic device 101 may send, to another device, a request for performing at least some functions related to the functions or services, instead of performing the functions or services by itself, or additionally. Another electronic device may execute the requested functions or the additional functions, and may deliver a result of the execution to the electronic device 101. The electronic device 101 may process the received result without any change or additionally, and may provide the requested functions or services. To this end, cloud computing technology, distributed computing technology, or client-server computing technology.

Figure 2:
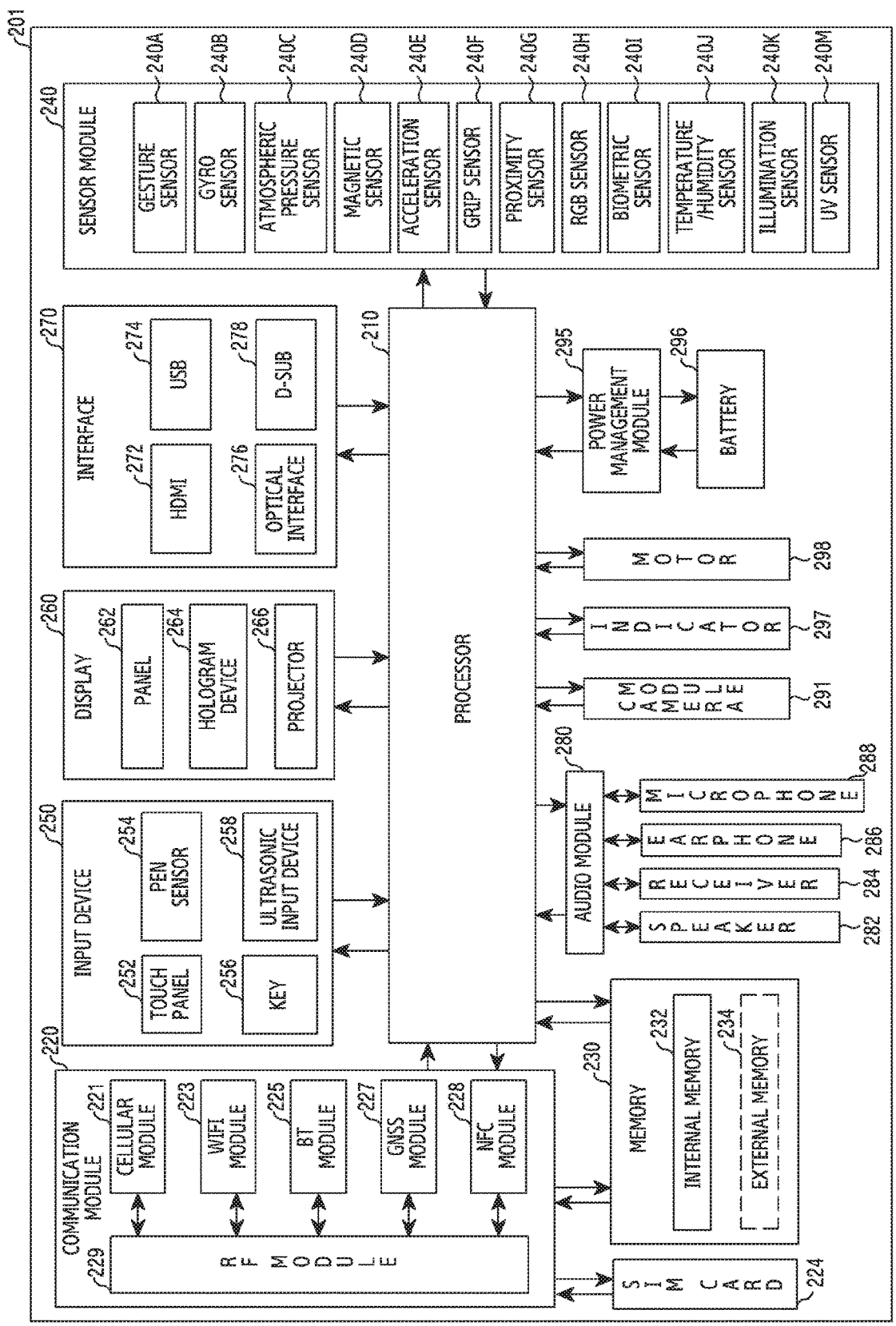
FIG. 2 is a block diagram illustrating the configuration of an electronic device according to various embodiments.

FIG. 2 is a block diagram illustrating a configuration of an electronic device, according to various embodiments of the present disclosure.

Referring to FIG. 2, the electronic device 201 may include one or more processors 210 (e.g., an AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an OS or an application program, and perform processing of various pieces of data and calculations. The processor 210 may be implemented as, for example, a system on chip (SoC). According to an embodiment of the present disclosure, the processor 210 may further include a graphic processing unit (GPU) and/or an image signal processor (ISP). The processor 210 may include a part (e.g., a cellular module 221) of the components of electronic device 201. The processor 210 may load, into a volatile memory, commands or data received from at least one (e.g., a non-volatile memory) of the other components and may process the loaded commands or data, and may store a variety of data in a non-volatile memory.

According to various embodiments of the present disclosure, the communication module 220 may, have a configuration equivalent or similar to that of the communication interface 170. The communication module 220 may include a cellular module 221, a Wi-Fi module 223, a Bluetooth (BT) module 225, a GNSS module 227 (e.g., a GPS module, a Glonass module, a Beidou module, or a Galileo module), an NFC module 228, and a RF module 229. The cellular module 221 may provide a voice call, a video call, a text message service, or an Internet service through a communication network. According to various embodiments of the present disclosure, the cellular module 221 may distinguish and authenticate the electronic device 201 in a communication network using the SIM 224 (e.g., the SIM card). The cellular module 221 may perform at least some of the functions that the processor 210 may provide. The cellular module 221 may include a CP.

At least some (e.g., two or more) of the cellular module 221, the Wi-Fi module 223, the BT module 225, the GNSS module 227, and the NFC module 228 may be included in one integrated circuit (IC) chip or IC package. The RF module 229 may transmit or receive a communication signal (e.g., an RF signal). The RF module 229 may include a transceiver, a power amplifier module (PAM), a frequency filter, a low noise amplifier (LNA), and an antenna. According to various embodiments of the present disclosure, one of the cellular module 221, the WI-FI module 223, the BT module 225, the GNSS module 227, and the NFC module 228 may transmit/receive an RF signal through a separate RF module. According to various embodiments of the present disclosure, SIM 224 may include a card including a SIM and/or an embedded SIM, and may contain unique identification information (e.g., an integrated circuit card identifier (ICCID)) or subscriber information (e.g., an international mobile subscriber identity (IMSI)).

The memory 230 may include an embedded memory 232 or an external memory 234. The embedded memory 232 may include a volatile memory (e.g., a dynamic random access memory (DRAM), a static RAM (SRAM), a synchronous dynamic RAM (SDRAM), etc.) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), etc.). The external memory 234 may further include a flash drive such as a compact flash (CF), a secure digital (SD), a micro secure digital (Micro-SD), a mini secure digital (mini-SD), an eXtreme Digital (xD), a multi-media card (MMC), a memory stick, etc. The external memory 234 may be functionally and/or physically connected to the electronic device 201 through various interfaces.

According to various embodiments of the present disclosure, sensor module 240 may measure a physical quantity or detect an operation state of the electronic device 201, and may convert the measured or detected information into an electrical signal. The sensor module 240 may include a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor 240I (e.g., medical sensor), a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include a recognition sheet which is a part of the touch panel or is separated from the touch panel. The key 256 may include a physical button, an optical key, or a keypad. The ultrasonic input device 258 may detect, through a microphone 288, ultrasonic waves generated by an input tool, and identify data corresponding to the detected ultrasonic waves.

The display 260 may include a panel 262, a hologram device 264, or a projector 266. The panel 262 may include a configuration identical or similar to the display 160. The panel 262 may be implemented to be flexible, transparent, or wearable. The panel 262 may be integrated as a single module with the touch panel 252.

The hologram device 264 may show a three dimensional (3D) image in the air by using an interference of light. The projector 266 may project light onto a screen to display an image. The screen may be located in the interior of or on the exterior of the electronic device 201. According to an embodiment of the present disclosure, the display 260 may further include a control circuit for controlling the panel 262, the hologram device 264, or the projector 266. The interface 270 may include a high-definition multimedia interface (HDMI) 272, a USB 274, an optical interface 276, or a D-subminiature (D-sub) 278. The interface 270 may be included in the communication interface 170. Additionally or alternatively, the interface 270 may include a mobile high-definition link (MHL) interface, a SD card/MMC interface, or an Infrared Data Association (IrDA) standard interface.

The audio module 280 may convert a sound to an electrical signal and vice versa. At least some components of the audio module 280 may be included in the input/output interface 150. The audio module 280 may process voice information input or output through a speaker 282, a receiver 284, earphones 286, or the microphone 288. The camera module 291 is a device which may photograph a still image and a video. According to various embodiments of the present disclosure, the camera module 291 may include one or more image sensors (e.g., a front sensor or a back sensor), a lens, an ISP or a flash (e.g., LED or xenon lamp).

The power management module 295 may manage power of the electronic device 201. According to an embodiment of the present disclosure, the power management module 295 may include a power management integrated circuit (PMIC), a charger IC, or a battery gauge. The PMIC may use a wired and/or wireless charging method. The wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state (e.g., a booting state, a message state, a charging state, etc.) of the electronic device 201 or a part (e.g., the processor 210) of the electronic device 201. The motor 298 may convert an electrical signal into a mechanical vibration, and may generate a vibration, a haptic effect, etc. The electronic device 201 may include a processing device (e.g., a GPU) for supporting a mobile TV. The processing device for supporting a mobile TV may process media data according to a certain standard such as digital multimedia broadcasting (DMB), digital video broadcasting (DVB), or mediaFLO™. According to an embodiment of the present disclosure, each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
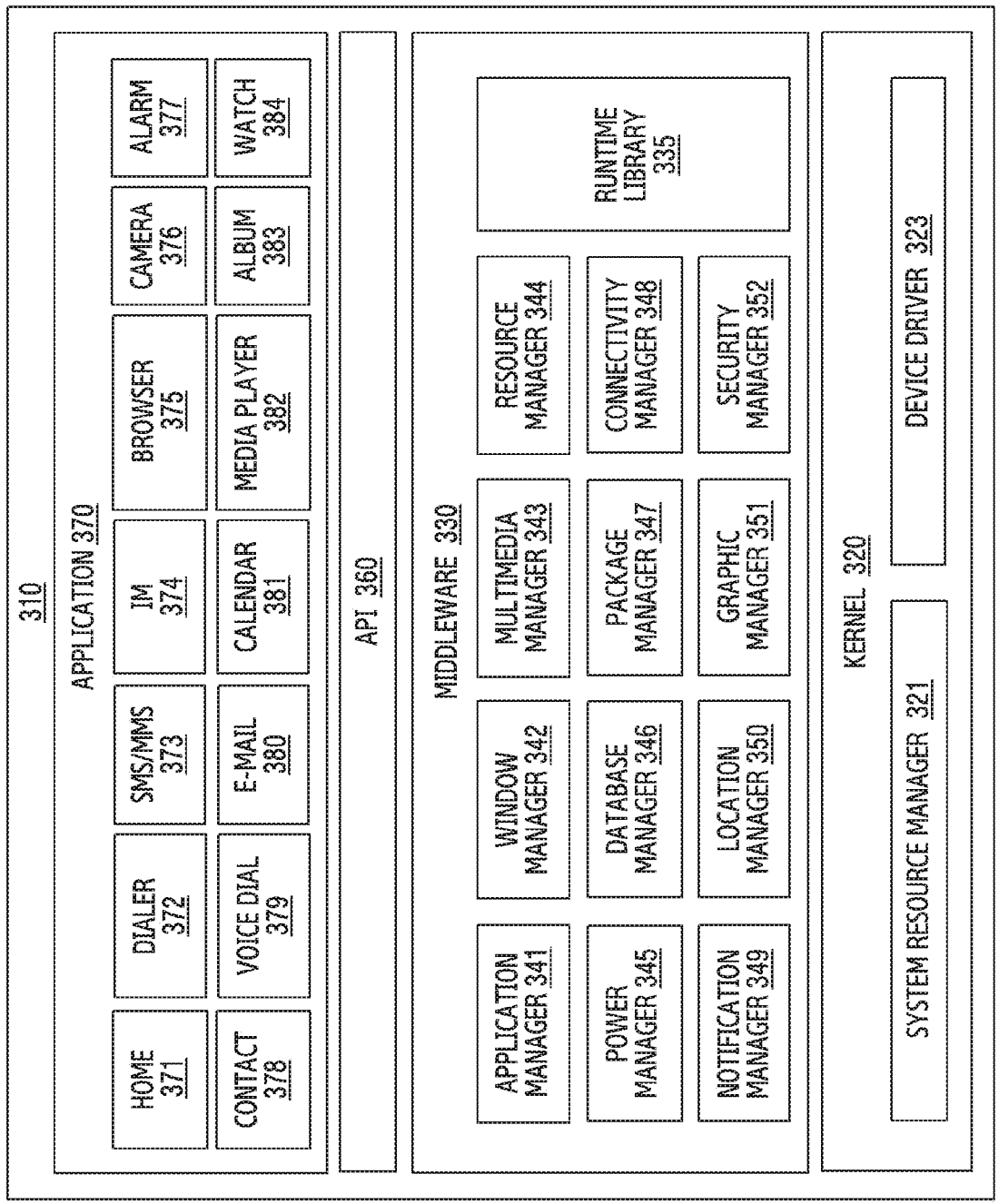
FIG. 3 is a block diagram illustrating a program module according to various embodiments.

FIG. 3 is a block diagram illustrating a configuration of a program module, according to various embodiments of the present disclosure;

According to an embodiment of the present disclosure, the program module 310 may include an OS for controlling resources related to the electronic device 101 and/or applications 147 executed in the OS. The OS may comprise Android™, iOS™, Windows™, Symbian™, Tizen™, Bada™, etc. Referring to FIG. 3, the program module 310 may include a kernel 320, middleware 330, an API 360, and/or applications 370. According to various embodiments of the present disclosure, at least some of the program module 310 may be preloaded on an electronic device, or may be downloaded from an external electronic device (e.g., the electronic device 102 or 104, or the server 106).

The kernel 320 may include a system resource manager 321 and/or a device driver 323. The system resource manager 321 may control, allocate, or collect system resources. According to various embodiments of the present disclosure, the system resource manager 321 may include a process management unit, a memory management unit, a file system management unit, etc. The device driver 323 may include a display driver, a camera driver, a Bluetooth™ driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 may include a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

According to various embodiments of the present disclosure, runtime library 335 may include a library module which a compiler uses in order to add a new function through a programming language while an application 370 is being executed. The runtime library 335 may perform input/output management, memory management, the functionality for an arithmetic function, etc. According to various embodiments of the present disclosure, the application manager 341 may manage, a life cycle of the applications 370. The window manager 342 may manage the graphical user interface (GUI) resources used by a screen. The multimedia manager 343 may recognize a format required for reproduction of various media files, and may perform encoding or decoding of a media file by using a codec suitable for the corresponding format.

The resource manager 344 may manage resources of a source code, a memory, and a storage space of at least one of the applications 370. According to various embodiments of the present disclosure, power manager 345 may operate together with a basic input/output system (BIOS) or the like to manage a battery or power source, and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, etc. in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, etc. According to an embodiment of the present disclosure, when the electronic device 101 provides a telephone call function, the middleware 330 may further include a telephony manager for managing a voice call function or a video call function of the electronic device.

According to various embodiments of the present disclosure, middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components. The API 360 includes a set of API programming functions, and may be provided with a different configuration according to an OS. In the case of Android or iOS, one API set may be provided for each platform. In the case of Tizen, two or more API sets may be provided for each platform.

The applications 370 may include one or more applications which provide functions such as a home 371 application, a dialer 372 application, an SMS/MMS 373 application, an instant message (IM) 374 application, a browser 375 application, a camera 376 application, an alarm 377 application, a contacts 378 application, a voice dial 379 application, an email 380 application, a calendar 381 application, a media player 382 application, an album 383 application, a watch 384 application, a healthcare application (e.g., measuring exercise quantity or blood sugar level), or an environment information application (e.g., providing atmospheric pressure, humidity, or temperature information). According to various embodiments of the present disclosure, applications 370 may include an information exchange application that can support the exchange of information between the electronic device and an external electronic device. The information exchange application may include a notification relay application for transferring specific information to an external electronic device or a device management application for managing an external electronic device.

According to various embodiments of the present disclosure, the notification relay application may include a function of transferring, to the external electronic device, notification information generated from other applications of the electronic device 101 (e.g., an SMS/MMS application, an e-mail application, a health management application, or an environmental information application). Further, the notification relay application may receive notification information from an external electronic device and provide the received notification information to a user. According to various embodiments of the present disclosure, the device management application may manage (e.g., install, delete, or update) at least one function of an external electronic device communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service). According to various embodiments of the present disclosure, the applications 370 may include applications (e.g., a healthcare application of a mobile medical appliance or the like) designated according to an external electronic device. The applications 370 may include an application received from an external electronic device. The applications 370 may include a preloaded application or a third party application that may be downloaded from a server. The names of the components of the program module 310 may change depending on the type of OS. According to various embodiments of the present disclosure, at least a part of the programming module 310 may be implemented in software, firmware, hardware, or a combination of two or more thereof. At least some of the program module 310 may be implemented (e.g., executed) by the processor. At least some of the program module 310 may include a module, a program, a routine, a set of instructions, and/or a process for performing one or more functions.

A term "module" used in the present disclosure includes a unit consisting of hardware, software, or firmware, and may be interchangeably used with the terms "a unit", "a logic", "a logical block", "a component", "a circuit", etc. The term "module" may be an integrally constructed component or a minimum unit or one part thereof for performing one or more functions. The "module" may be mechanically or electrically implemented, and may include an application specific integrated circuit (ASIC) chip, field programmable gate arrays (FPGAs), or a programmable-logic device, which is known or is to be developed to perform certain operations. At least one part of an apparatus (e.g., modules or functions thereof) or method (e.g., operations) according to various embodiments of the present disclosure may be implemented with an instruction stored in a non-transitory computer-readable storage media. If the instruction is executed by one or more processors, the one or more processors may perform a function corresponding to the instruction.

Figure 4:
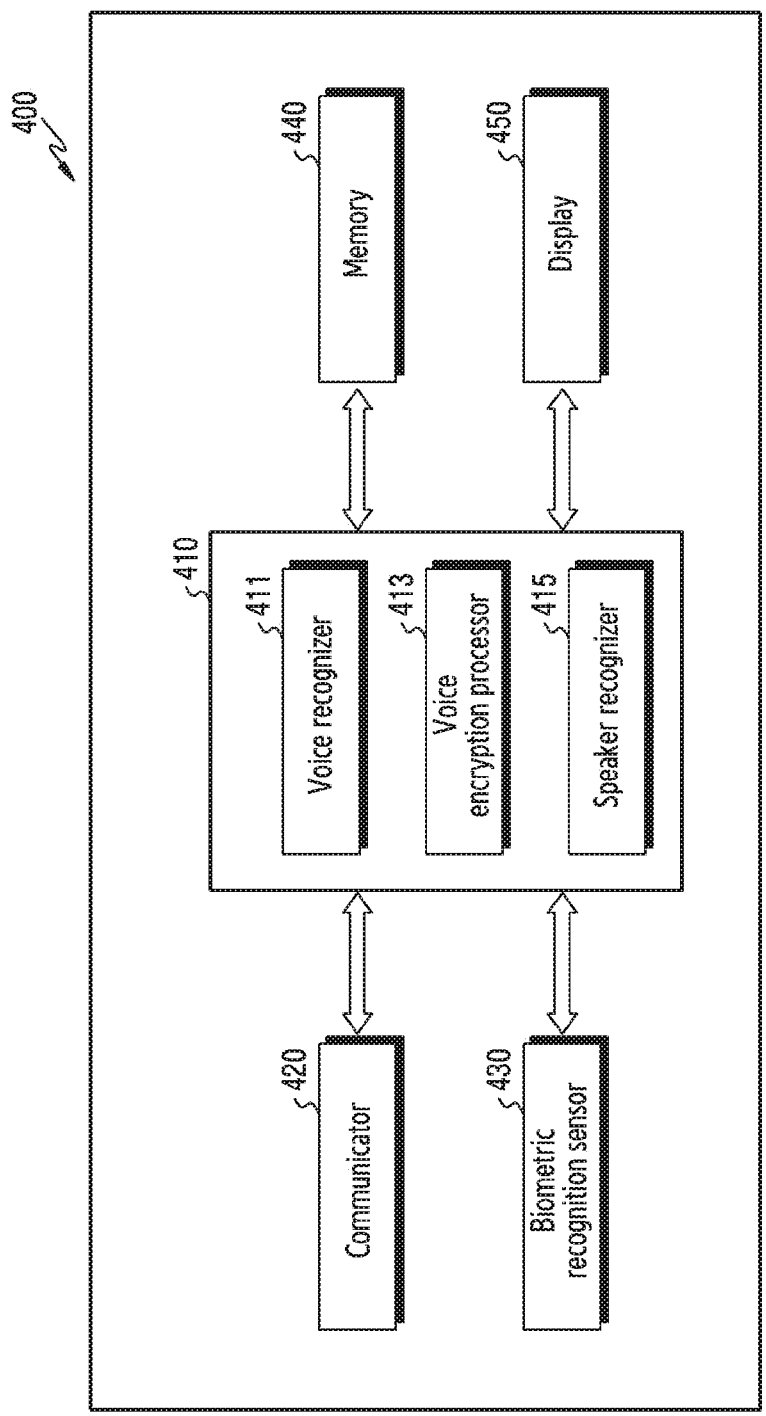
FIG. 4 illustrates the configuration of an electronic device according to various embodiments.

FIG. 4 illustrates the configuration of an electronic device according to various embodiments.

Referring to FIG. 4, the electronic device 400 (e.g., the electronic device 101 or the electronic device 201) may include a processor 410, a voice recognizer 411, a biometric recognition sensor 430, a memory 440, a display 450, and a communicator 420.

The processor 410 may recognize a detected voice, may encrypt selected content by a voice, and may provide the encrypted content based on a user's voice. The content may include at least one of text, an image, a video, a document, a file, an application, or a program. The processor 410 may include the voice recognizer 411, a voice encryption processor 413, or a speaker recognizer 415. The voice recognizer 411 may process (e.g., preprocess) a sound input through a microphone (e.g., the microphone 288) into a voice signal and may recognize a voice (e.g., automatic speech recognition: ASR). Further, the voice recognizer 411 may perform language processing (e.g., natural language understanding: NLU), dialogue management (DM), or text-to-speech (TTS) conversion on the recognized voice. The voice recognizer 411 may interwork with a voice processing server for voice processing or voice recognition. That is, the voice recognizer 411 may transmit the voice signal to the voice processing server and may receive voice information (or text information corresponding to the voice information) from the voice processing server. The voice recognizer 411 may transmit the recognized voice information to the voice encryption processor 413.

The voice encryption processor 413 may generate password information using the characteristics (e.g., attribute information, metadata, or tag information) of content selected by the user. Further, the voice encryption processor 413 may generate the password information further considering context information about the electronic device 400. The voice encryption processor 413 may encrypt the selected content by a voice using the voice information transmitted from the voice recognizer 411. Encrypting content may refer to, for example, processing content not to be shown to a non-user. Thus, content encryption may refer to content hiding or content locking.

The speaker recognizer 415 may recognize whether the voice information transmitted from the voice recognizer 411 corresponds to the user's voice. For example, when the voice information transmitted from the voice recognizer 411 corresponds to the user's voice, the speaker recognizer 415 may control the encrypted content to be provided. When the voice information transmitted from the voice recognizer 411 does not correspond to the user's voice, the speaker recognizer 415 may control the encrypted content not to be provided. Alternatively, when the voice information transmitted from the voice recognizer 411 does not correspond to the user's voice, the speaker recognizer 415 may request the user to recognize biometric information.

The biometric recognition sensor 430 may be a sensor that recognizes biometric features of the user. For example, the biometric recognition sensor 430 may include at least one of a voice recognition sensor, a retina recognition sensor, an iris recognition sensor, a face recognition sensor, or a fingerprint recognition sensor. The biometric recognition sensor 430 may transmit recognized biometric information about the user to the processor 410.

The processor 410 may store the password information and voice information corresponding to the password information in the memory 440. The memory 440 may include a password storage unit that stores password information and voice information corresponding to the password information and a content storage unit that stores content encrypted by the voice information. The memory 440 may store a voice instruction table corresponding to a user's voice, a voice call instruction, a hide instruction (encrypt instruction or lock instruction), a release instruction, or a content import instruction. The memory 440 may further store biometric information. The memory 440 may be equivalent or similar to the memory 130 of FIG. 1 or the memory 230 of FIG. 2.

The processor 410 may display various user interfaces relating to executed content or a content password on the display 450. The display 450 may be equivalent or similar to the display 160 of FIG. 1 or the display 260 of FIG. 2. The processor 410 may exchange data with another electronic device or a server connected to the electronic device 400 using the communicator 420. The communicator 420 may be equivalent or similar to the communication interface 170 of FIG. 1 or the communication module 220 of FIG. 2.

An electronic device 400 according to various embodiments may include: a voice recognizer 411; a memory 440; a display 450; and a processor 410 configured to be functionally connected to the voice recognizer, the memory, or the display, wherein the processor may be configured to: obtain password information about content selected by a user when voice information about the user recognized by the voice recognizer includes a hide instruction; request the user to articulate the obtained password information; and to encrypt the content based on voice information received according to the request.

The processor may be configured to determine whether the voice information is a voice of an authenticated user, and to generate the password information when the voice information is the voice of the authenticated user.

The processor may be configured to generate the password information based on at least one piece of information associated with the selected content.

The processor may be configured to generate the password information based on attribute information about the content or context information about the electronic device.

The processor may be configured to receive the password information input from the user.

The processor may be configured to store the password information and voice information corresponding to the password information in association with the content in the memory.

When the voice information recognized by the voice recognizer is an encrypted content import instruction, the processor may be configured to request articulation of password information associated with encrypted content, to determine whether the voice information received according to the request is the same as password information stored in the memory, and to provide the encrypted content.

The processor may be configured to provide the encrypted content when the voice information received according to the request is the same as voice information corresponding to the password information stored in the memory.

The electronic device may further include a biometric recognition sensor 430, wherein the processor may be configured to provide the encrypted content through biometric information authentication using the biometric recognition sensor when text information of the voice information received according to the request is not the same as the password information stored in the memory.

When the voice information recognized by the voice recognizer includes a content import instruction, the processor may be configured to retrieve content stored in the memory, to determine whether the retrieved content is encrypted, to request articulation of password information associated with the encrypted content when the content is encrypted, to determine whether the voice information received according to the request is the same as password information stored in the memory, and to provide the encrypted content.

When the voice information recognized by the voice recognizer is an encrypted content release instruction, the processor may be configured to request articulation of password information associated with encrypted content, to determine whether the voice information received according to the request is the same as password information stored in the memory, and to decrypt the encrypted content with a password.

The processor may be configured to decrypt the encrypted content with the password through biometric information authentication using the biometric recognition sensor when text information of the voice information received according to the request is not the same as the password information stored in the memory.

Figure 5:
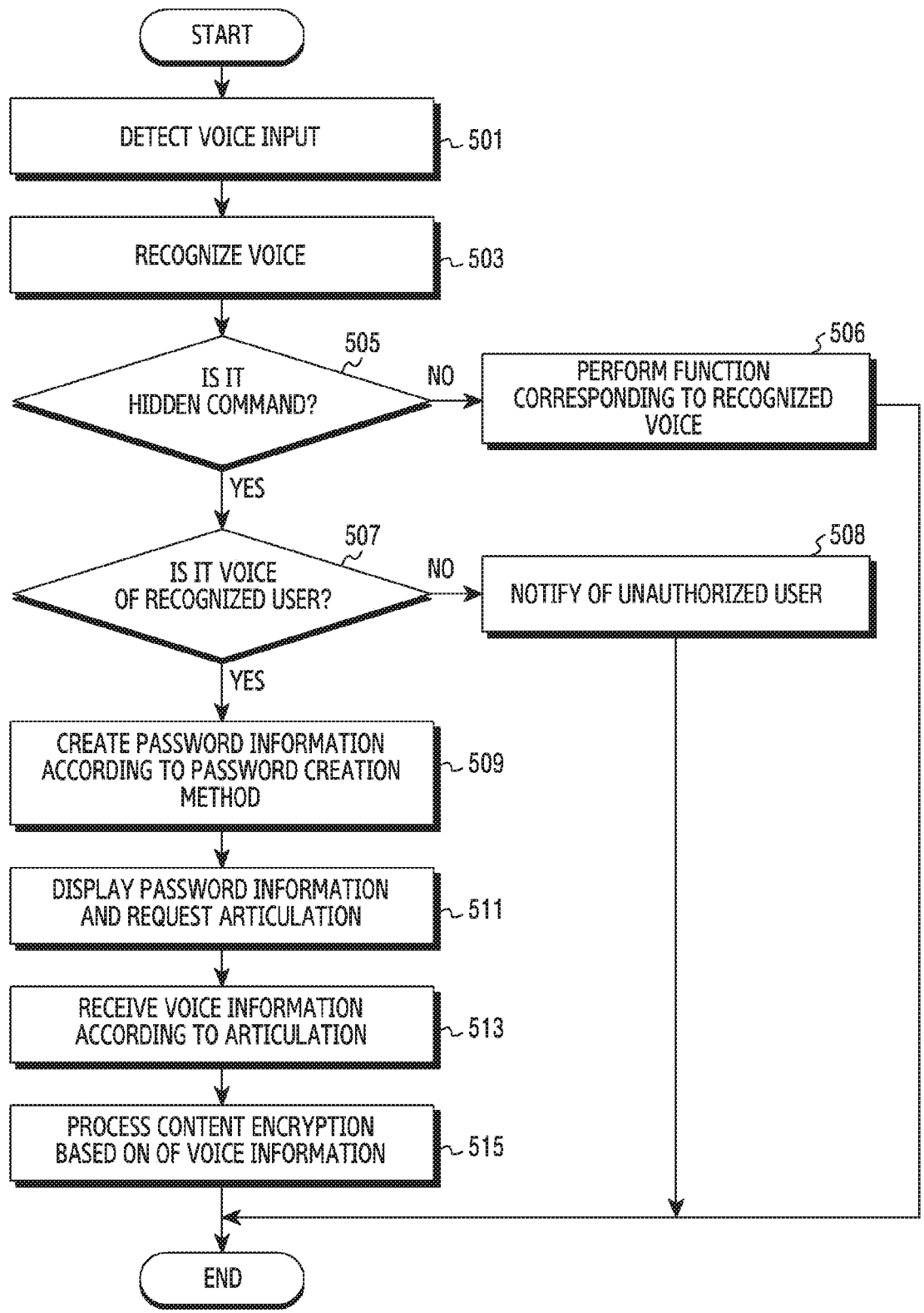
FIG. 5 is a flowchart illustrating the operating method of an electronic device according to various embodiments.

FIG. 5 is a flowchart illustrating the operating method of an electronic device according to various embodiments.

Referring to FIG. 5, in operation 501, the electronic device 400 (e.g., the processor 410) may detect a voice input. The processor 410 (e.g., the voice recognizer 411) may detect whether a sound is input via a microphone (e.g., the microphone 288). According to various embodiments, the processor 410 may start a voice service (e.g., voice function activation) based on a voice wake-up mode. To this end, the processor 410 may further include a wake-up processor (or wake-up engine). According to various embodiments, the electronic device 400 may include a first processor in low power mode including the wake-up processor and a second processor including the voice recognizer 411, the voice encryption processor 413, and the speaker recognizer 415.

According to one embodiment, the processor 410 may use a particular voice instruction (e.g., a word) as a voice call instruction (e.g., a wake-up word), and may not perform voice recognition of user articulation before a voice call instruction is input. A voice call instruction (e.g., a wake-up word) may be, for example, a name of an electronic device (or an agent of the electronic device or artificial intelligence (AI)). A user needs to use a voice call instruction to drive a voice recognition engine (e.g., a voice agent) in order to use a voice service in the electronic device 400, and this voice call instruction may be referred to as a wake-up command or a wake-up word. When the electronic device recognizes a voice call instruction, the electronic device drives the voice recognition engine, and then recognizes user articulation, and provides a voice service.

According to various embodiments, the processor 410 may start a voice service based on a user input, for example, when a particular button (e.g., a home button) is selected or a particular instruction is input. The processor 410 (e.g., the voice recognizer 411) may start a voice service, may detect a voice input via a microphone, and may process a voice signal. Voice signal processing is a preprocessing procedure for voice recognition, which may mean, for example, converting a sound into a voice signal.

In operation 503, the electronic device 400 (e.g., the processor 410) may recognize a voice from the detected voice input. For example, the processor 410 (e.g., the voice recognizer 411) may perform language processing on the converted voice signal to be converted into text (e.g. speech-to-text conversion). Voice recognition technology is already known, and thus a detailed description thereof may be omitted.

In operation 505, the electronic device 400 (e.g., the processor 410) may determine whether the recognized voice includes a hide instruction (encrypt instruction or lock instruction). When the recognized voice includes the hide instruction, the processor 410 may determine that the user has spoken with intent to hide content. The hide instruction may be a command to request the encryption of content so that the content is not shown to a non-user. For example, the hide instruction may include a word, such as "hide", "cover", "password", "security", "confidential", or "lock". A word for the hide instruction may be stored in advance in the memory 440. The processor 410 (e.g., the voice encryption processor 413) may determine whether the text converted from the voice corresponds to the hide instruction stored in the memory 440.

When at least part of text information converted from the voice corresponds to the hide instruction, the processor 410 may perform operation 507. When at least part of the text information converted from the voice does not correspond to the hide instruction, the processor 410 may perform operation 506.

In operation 506, the electronic device 400 (e.g., the processor 410) may perform a function corresponding to the recognized voice. According to various embodiments, the processor 410 (e.g., the voice recognizer 411) may provide various functions (or services) corresponding to the recognized voice using voice recognition technology. For example, the processor 410 may provide various functions, such as mobile search, scheduling, making a call, taking a note, or playing music, based on the text converted from the voice.

In operation 507, the electronic device 400 (e.g., the processor 410) may determine whether the recognized voice (or the detected voice input) is the voice of an authenticated user. According to various embodiments, the processor 410 (e.g., the speaker recognizer 415) may identify the user's voice using the voice signal. For example, the processor 410 may extract a particular frequency from the voice signal and may determine whether the extracted frequency corresponds to a user-specific voice frequency. To this end, the memory 440 may store the voice frequency of the user's voice. Operation 507 may be performed before voice recognition, that is, after operation 501. However, when the recognized voice is not the hide instruction, a general voice service is provided. Therefore, when a voice service is provided, an operation of determining whether the voice is the voice of the authenticated user may not be performed. When the hide instruction is input and the recognized voice is not the voice of the authenticated user, the processor 410 may not perform operations for encrypting content (e.g., operations 509 to 515).

When the recognized voice corresponds to the voice of the authenticated user, the processor 410 may perform operation 509. When the recognized voice does not correspond to the voice of the authenticated user, the processor 410 may perform operation 508.

In operation 508, the electronic device 400 (e.g., the processor 410) may report that the recognized voice is an unauthenticated user. The processor 410 (e.g., the speaker recognizer 415) may indicate that the recognized voice is not the user of the electronic device 400. For example, when the voice frequency associated with the voice of the user is not stored in the memory 440, the processor 410 may request the user to store the voice frequency. The processor 410 may display a notification message, such as "Authenticate your voice first", on the display 450 or may output a notification message (e.g., "Authenticate your voice first") as a sound through a speaker (e.g., the speaker 282). The user may first authenticate the user's voice and may then input a voice into the electronic device 400 as in operation 501.

For example, when the recognized voice does not match a voice frequency stored in the memory 440, the processor 410 may request the user to re-input a voice. The processor 410 may display a notification message, such as "Authentication has failed. Input your voice again", on the display 450 or may output the notification message as a sound through the speaker (e.g., the speaker 282). In this case, when the recognized voice matches the user's voice but voice recognition fails due to an error in the electronic device 400, the user may input a voice into the electronic device 400 again as in operation 501.

For example, since the recognized voice does not match a voice frequency stored in the memory 440, the processor 410 may indicate that a content encryption process cannot be performed. The processor 410 may display a notification message, such as "Authentication has failed. The service is terminated", on the display 450 or may output the notification message as a sound through the speaker (e.g., the speaker 282). In this case, when the recognized voice matches the user's voice but voice recognition fails due to an error in the electronic device 400, the user may input a voice into the electronic device 400 again as in operation 501. A non-user may recognize that it is impossible to use the service via the person's voice and may not proceed any more.

In operation 509, the electronic device 400 (e.g., the processor 410) may generate password information according to a password generation method. According to various embodiments, the processor 410 (e.g., the voice encryption processor 413) may receive a selection of content to hide from the user before performing operation 501. The content may include at least one of text, an image, a video, a document, a file, an application, or a program. For example, the user may input a voice including a hide instruction with at least part of the content to hide displayed on the display 450.

According to various embodiments, the processor 410 may receive a selection of content to hide from the user after performing operation 507. For example, after performing operation 507, the processor 410 may provide a list of content that is currently running on the electronic device 400 or a list of content possible to hide among content stored in the memory 440. The processor 410 may receive at least one piece of content selected by the user from the list of content.

According to various embodiments, the processor 410 (e.g., the voice encryption processor 413) may generate password information using attribute information about the content selected by the user or context information about the electronic device 400. For example, the attribute information about the content refers to information associated with the content and may further include metadata or tag information. The context information may be information obtained from the electronic device 400 when generating (or obtaining) the content. For example, the context information may include at least one of a date, a time, a location (e.g., a geographical location), or a storage location. Alternatively, the context information may further include usage history information based on the usage history of the user. The usage history information may include an application most frequently used by the user, a word most frequently used, information about a counterpart most frequently contacted, and the like. The attribute information about the content may be at least one of a name, a size, a type, a generation date and time, a generation location, a generation mode, a generation method, playback time, a storage location, album information, or memo information associated with the content.

According to various embodiments, the processor 410 may receive password information directly from the user. The user may say desired password information thereof or may directly input the password information via a keypad. The processor 410 may receive the password information via a microphone (e.g., the microphone 288) or an input device (e.g., the input device 250).

In operation 511, the electronic device 400 (e.g., the processor 410) may display the password information and may request articulation of the password information. The processor 410 (e.g., the voice encryption processor 413) may display the generated password information on the display 450 and may lead the user to say the displayed password information out loud. For example, when the password information is "Yeouido nighttime image", the processor 410 may display an articulation request message "Repeat Yeouido nighttime image" on the display 450. In addition, the processor 410 may output "Repeat Yeouido nighttime image" as a sound through a speaker (e.g., the speaker 282).

In operation 513, the electronic device 400 (e.g., the processor 410) may receive voice information resulting from the articulation. The processor 410 (e.g., the voice recognizer 411) may receive a voice input through a microphone (e.g., the microphone 288) from the user in operation 511. The processor 410 may perform signal processing on the input voice and may recognize the voice. For example, the processor 410 may transmit a voice signal of the input voice to a voice processing server and may receive voice information (or text information corresponding to voice information) from the voice processing server.

In operation 515, the electronic device 400 (e.g., the processor 410) may encrypt the content based on the voice information. The processor 410 (e.g., the voice encryption processor 413) may encrypt the content using part or the entirety of the obtained voice information and may store the encrypted content in the memory 440. In addition, the processor 410 may display the result of encrypting the content. For example, the processor 410 may display, as the result of encrypting the content, password information about the encrypted content or a lock-indicating image (e.g., a lock icon) on the content. Alternatively, the processor 410 may blur or shade the content as the result of encrypting the content.

Figure 6:
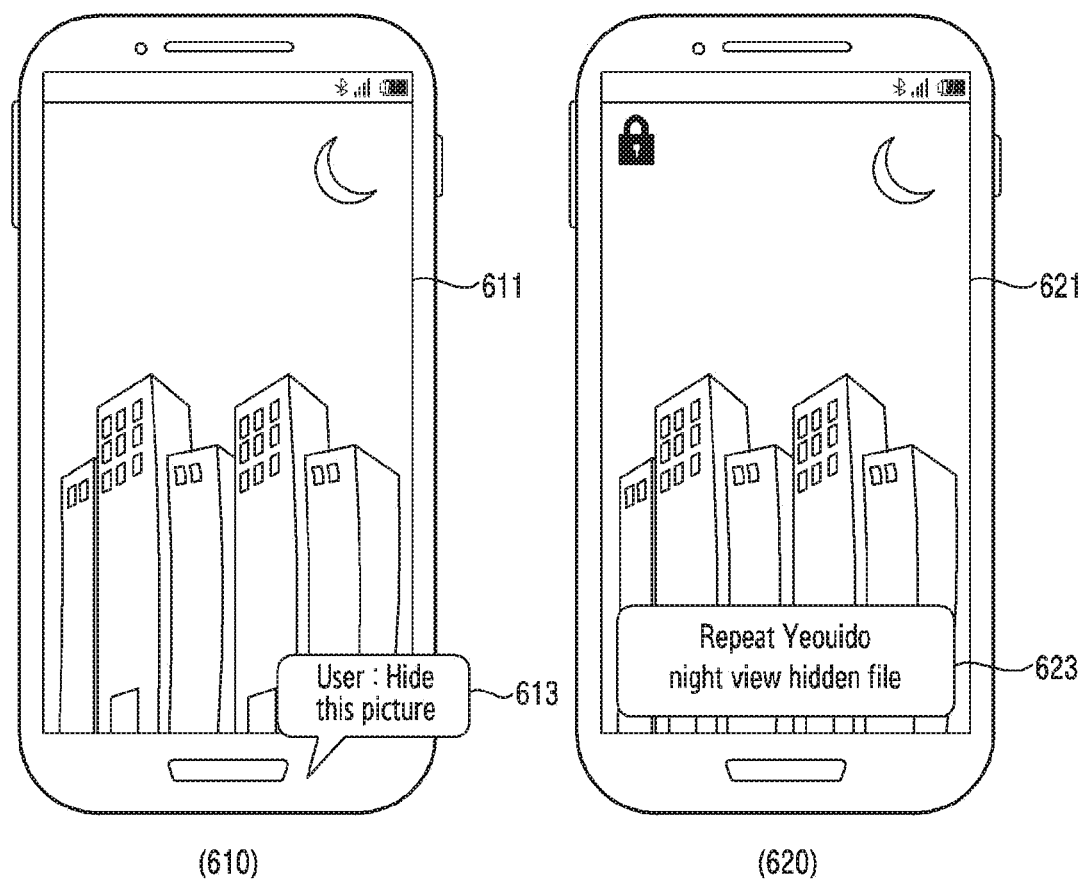
FIG. 6 illustrates a user interface associated with content hiding according to various embodiments.

FIG. 6 illustrates a user interface associated with content hiding according to various embodiments.

Referring to FIG. 6, the electronic device 400 (e.g., the processor 410) may display a first user interface 610 including content 611 on the display 450. The processor 410 may receive a voice 613 input from the user on the first user interface 610. For example, the voice 613 may be input through a microphone (e.g., the microphone 288) provided at a lower portion of the electronic device 400. The processor 410 may transmit a voice signal resulting from signal processing of the voice 613 to the voice processing server and may receive voice information from the voice processing server. The processor 410 may determine whether the voice information corresponding to the voice 613 includes a hide instruction. When the voice information includes the hide instruction, the processor 410 may generate password information for encrypting the content 611 based on information associated with the content 611. The information associated with the content 611 may include attribute information (e.g., a picture) about the content 611 or context information (e.g., a time, a location, a usage history) of the electronic device 400. For example, the processor 410 may generate password information as "Yeouido night view hidden file".

The processor 410 may display a second user interface 620 including content 621 and an articulation request message 623 for content encryption on the display 450. The articulation request message 623 may be a notification message "Repeat Yeouido night view hidden file" provided for the user. In addition, the processor 410 may output the articulation request message 623 as a sound via a speaker (e.g., the speaker 282). The processor 410 may receive a voice input from the user via the microphone (e.g., microphone 288) by the articulation request message 623. The processor 410 may transmit a voice signal of the input voice to the voice processing server and may receive voice information from the voice processing server. The processor 410 may encrypt the content based on part or the entirety of the voice information. The processor 410 may encrypt the content based on the voice information and display the result of encrypting the content. For example, the processor 410 may display, as the result of encrypting the content, password information about the encrypted content or a lock-indicating image (e.g., a lock icon) on the content.

Figure 7:
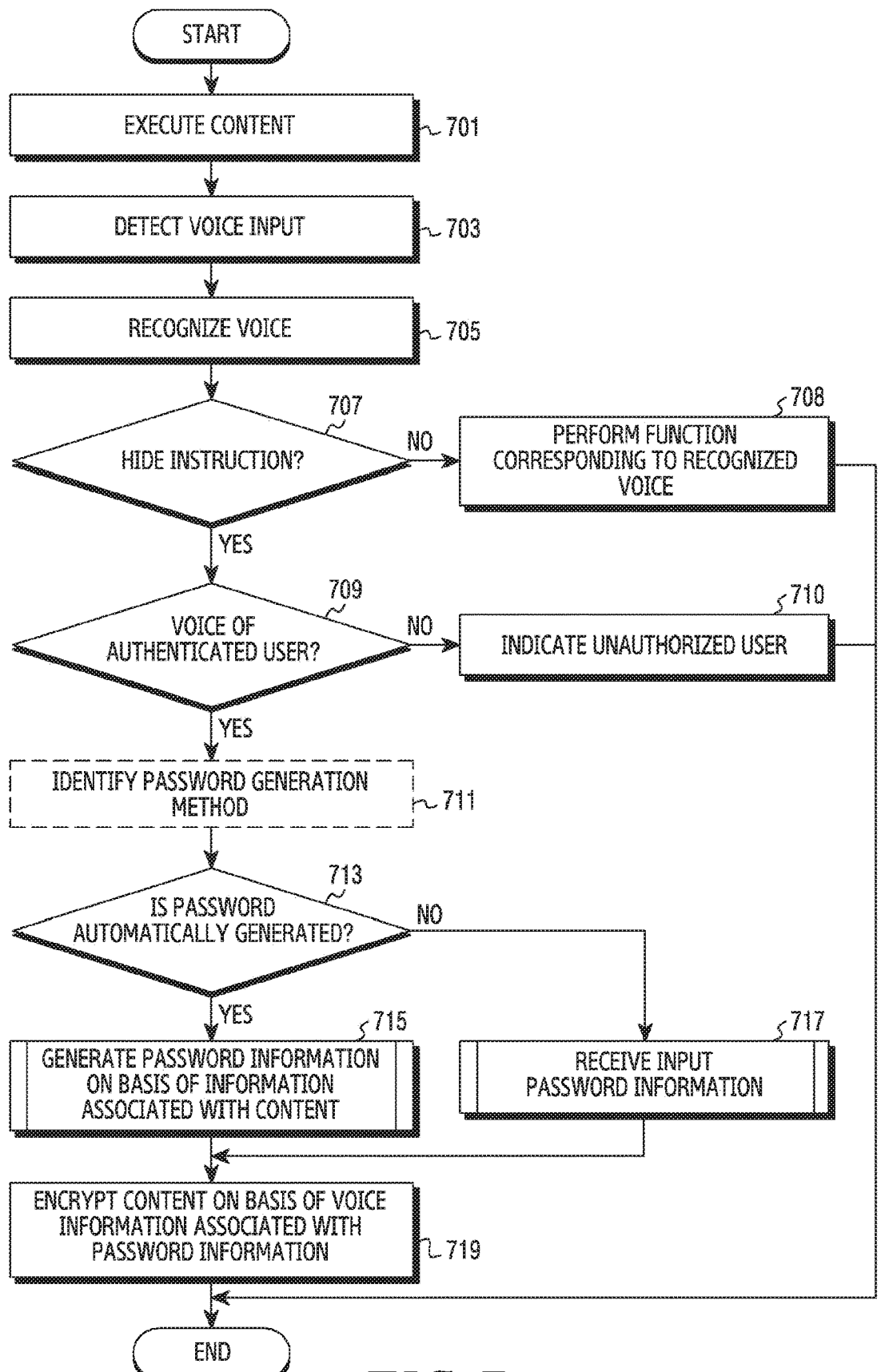
FIG. 7 is a flowchart illustrating a content encryption method using a user voice according to various embodiments.

FIG. 7 is a flowchart illustrating a content encryption method using a user voice according to various embodiments. FIG. 7 specifically illustrates the flowchart of FIG. 5.

Referring to FIG. 7, in operation 701, the electronic device 400 (e.g., the processor 410) may execute content. The processor 410 may execute the content by a command of the user. The content may include at least one of text, an image, a video, a document, a file, an application, and a program. For example, the processor 410 may display the executed content on the display 450.

In operation 703, the electronic device 400 (e.g., the processor 410) may detect a voice input. The processor 410 (e.g., the voice recognizer 411) may detect whether a sound is input via a microphone (e.g., the microphone 288). For example, when at least one of a voice call instruction (e.g., a wake-up word), the selection of a particular button, and the input of a particular instruction is detected, the processor 410 may activate a function for voice recognition (e.g., a voice service). Operation 703 is equivalent or similar to operation 501 of FIG. 5, and thus a detailed description thereof will be omitted.

In operation 705, the electronic device 400 (e.g., the processor 410) may recognize a voice from the detected voice input. For example, the processor 410 (e.g., the voice recognizer 411) may perform language processing on a converted voice signal, thereby converting the voice signal into text. The processor 410 may interwork with a voice processing server for the voice recognition. Operation 705 is equivalent or similar to operation 503 of FIG. 5, and thus a detailed description thereof will be omitted.

In operation 707, the electronic device 400 (e.g., the processor 410) may determine whether the recognized voice includes a hide instruction. For example, the hide instruction may include a word, such as "hide", "cover", "password", "security", "confidential", or "lock". A word for the hide instruction may be stored in the memory 440 in advance. The processor 410 (e.g., the voice encryption processor 413) may determine whether text information corresponding to the recognized voice corresponds to the hide instruction stored in the memory 440. Operation 707 is equivalent or similar to operation 505 of FIG. 5, and thus a detailed description thereof will be omitted.

When at least part of the text information converted from the voice corresponds to the hide instruction, the processor 410 may perform operation 709. When at least part of the text information converted from the voice does not correspond to the hide instruction, the processor 410 may perform operation 708.

In operation 708, the electronic device 400 (e.g., the processor 410) may perform a function corresponding to the recognized voice. According to various embodiments, the processor 410 (e.g., the voice recognizer 411) may provide various functions (or services) corresponding to the text information converted from the voice. For example, when the recognized voice is 'memo', the processor 410 may execute a memo application to provide a memo list.

In operation 709, the electronic device 400 (e.g., the processor 410) may determine whether the recognized voice (or the detected voice input) is the voice of an authenticated user. The voice of the authenticated user may refer to a user who owns the electronic device 400. The hide instruction may be for the user to request the encryption of content in order to prevent in advance the content from being exposed to a person other than the user of the electronic device 400. Thus, when a hide instruction is input by a person other than the user of the electronic device 400, the processor 410 may not perform operations for encrypting content (e.g., operations 509 to 515). For example, processor 410 (e.g., the speaker recognizer 415) may extract a particular frequency from the voice signal and may determine whether the extracted frequency corresponds to a user-specific voice frequency stored in the memory 440.

According to various embodiments, operation 709 may be performed before voice recognition, that is, after operation 703. However, when the recognized voice is not the hide instruction, a general voice service is provided. Therefore, when operation 708 is performed, an operation of determining whether the voice is the voice of the authenticated user may not be performed. That is, in order to reduce unnecessary processing, the processor 410 may determine whether the voice input is the voice of the authenticated user only when the recognized voice includes a hide instruction.

According to various embodiments, depending on user settings or the configuration of the electronic device 400, the processor 410 may determine whether the voice input is the voice of the authenticated user even when providing a voice service, because scheduling, making a call, and the like may be locked during the voice service. In this case, the processor 410 may determine whether a voice recognized before performing the voice service is the voice of the authenticated user, and may provide the voice service only when the voice is the voice of the authenticated user. That is, the processor 410 may determine whether a recognized voice is the voice of the authenticated user before performing any voice service or when a voice service to be performed is locked by the user. In this case, operation 709 may be performed before operation 705. When the recognized voice is the voice of the authenticated user and no hide instruction is included in the recognized voice, the processor 410 may provide a voice service.

When the recognized voice corresponds to the voice of the authenticated user, the processor 410 may perform operation 711. When the recognized voice does not correspond to the voice of the authenticated user, the processor 410 may perform operation 710.

In operation 710, the electronic device 400 (e.g., the processor 410) may report that the recognized voice is an unauthenticated user. The processor 410 (e.g., the speaker recognizer 415) may indicate that the recognized voice is not the user of the electronic device 400. For example, when the voice frequency associated with the voice of the user is not stored in the memory, the processor 410 may request the user to store the voice frequency. Alternatively, when the recognized voice does not match the voice frequency stored in the memory 440, the processor 410 may request the user to re-input a voice. Alternatively, since the recognized voice does not match the voice frequency stored in the memory 440, the processor 410 may indicate that a content encryption process cannot be performed.

In operation 711, the electronic device 400 (e.g., the processor 410) may identify a password generation. The user may preconfigure in the electronic device 400 whether to allow the electronic device 400 to automatically generate password information (e.g., an automatic password generation method) or to allow the user to directly input a desired password (e.g., a manual password generation method) when the electronic device 400 encrypts content. The processor 410 may determine a password generation method desired by the user by checking a password generation method set in the electronic device 400.

According to various embodiments, the processor 410 may provide a user interface for selecting a password generation method. The user interface may include an automatic password generation button and a manual password generation button along with a notification message "Select a password generation method". When the user selects the automatic password generation button, the processor 410 may perform operation 715. When the user selects the manual password generation button, the processor 410 may perform operation 717.

In operation 713, the electronic device 400 (e.g., the processor 410) may determine whether the password generation method is the automatic password generation. When the password generation method set in the electronic device 400 is an automatic password generation method, the processor 410 may perform operation 715. When the password generation method set in the electronic device 400 is a manual password generation method, the processor 410 may perform operation 717.

One of operation 711 and operation 713 may be omitted. That is, the processor 410 may identify the password generation method set in the electronic device 400, may perform operation 715 in the case of an automatic password generation method, and may perform operation 717 in the case of manual password generation. Alternatively, when the user selects the automatic password generation button on the user interface for selecting the password generation method, the processor 410 may perform operation 715; when the user selects the manual password generation button, the processor 410 may perform operation 717.

In the automatic password generation method, the electronic device 400 (e.g., the processor 410) may generate password information based on information associated with the content in operation 715. For example, the processor 410 may generate password information based on the characteristics of the content executed in operation 701 so that the user can easily memorize a password to the content. The processor 410 may generate password information using attribute information about the content or context information about the electronic device 400. For example, the attribute information about the content refers to information associated with the content and may further include metadata or tag information. The context information may be information obtained from the electronic device 400 when generating the content. For example, the context information may include at least one of a date, a time, a location, or a storage location. Alternatively, the context information may further include usage history information based on the usage history of the user. The attribute information about the content may be at least one of a name, a size, a type, a generation date and time, a generation location, a generation mode, a generation method, playback time, a storage location, album information, and memo information associated with the content. The processor 410 may generate the password information considering all or some of a plurality of pieces of content attribute information or a plurality of pieces of context information together. The automatic password generation method will be described in detail with reference to FIG. 8 to be described.

In the manual password generation method, the electronic device 400 (e.g., the processor 410) may receive password information input from the user in operation 717. For example, the user may say desired password information or may directly input the desired password information through a keypad. The processor 410 may receive the password information via a microphone (e.g., the microphone 288) or an input device (e.g., the input device 250). The manual password generation method will be described in detail with reference to FIG. 8 to be described.

In operation 719, the electronic device 400 (e.g., the processor 410) may encrypt the content based on voice information associated with the password information. Manually generated password information may be a sound or text, while automatically generated password information may be text information. Text-type password information may be similar to an existing encryption method, such as a password or a confidential pattern. In the disclosure, when the content is encrypted, the user's voice may be used as a password by the user directly articulating password information in a voice, instead of text-type password information. In this case, the encrypted content may be provided only when the password information in the form of a voice-recognized text matches the voice information that is the user's voice, thereby improving security.

To this end, when the password information is generated automatically or manually, the processor 410 may display the generated password information and may request articulation of the password information. That is, the processor 410 may request articulation to lead the user to read the password information out loud. For example, the processor 410 may display the generated password information on the display 450 and may lead the user to say the displayed password information out loud. The processor 410 may receive a voice from the user via a microphone (e.g., the microphone 288) in response to the articulation request. The processor 410 may perform signal processing on the input voice to recognize the voice. The processor 410 may encrypt the content based on the voice-recognized voice information and may store the encrypted content in the memory 440.

Figure 8:
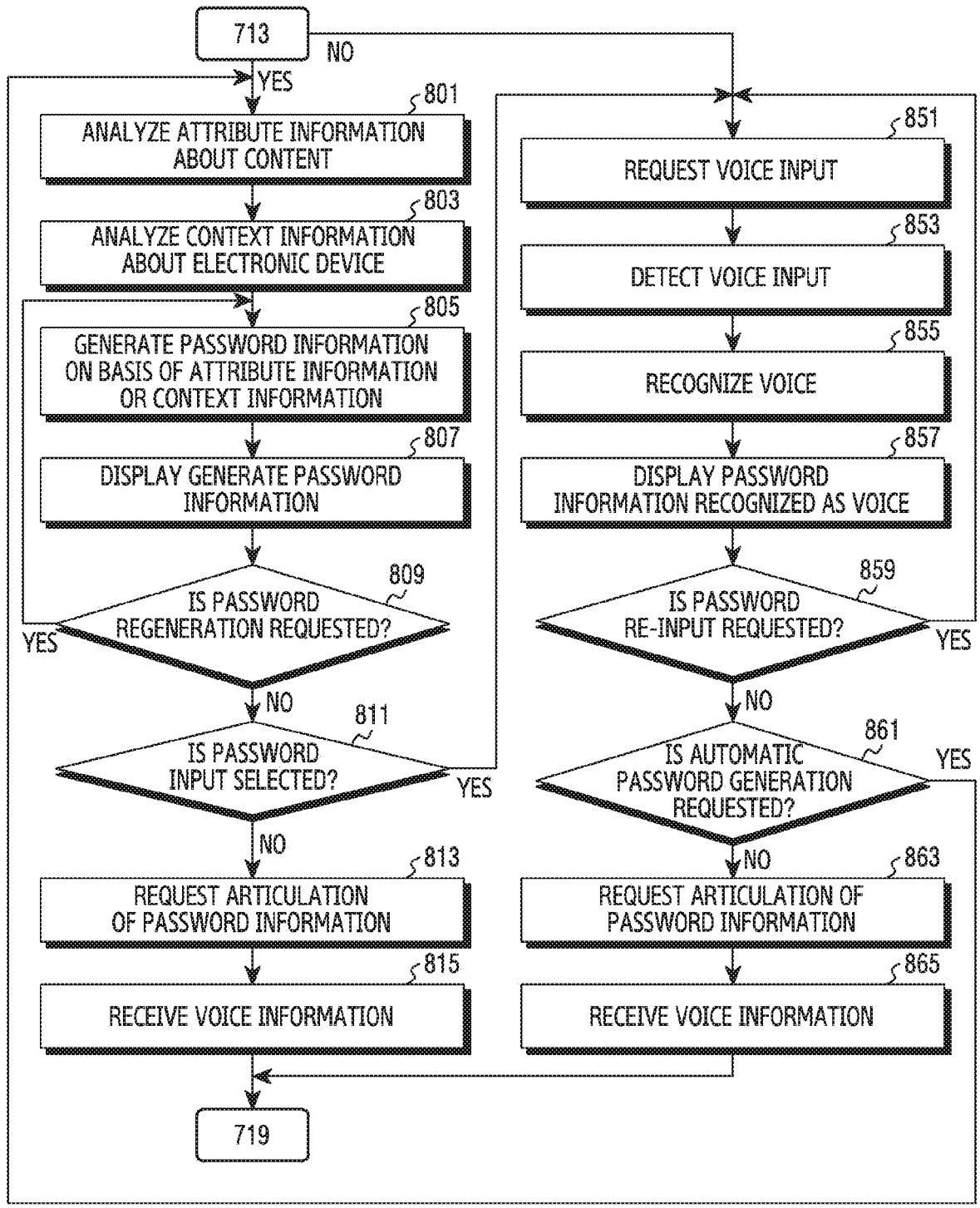
FIG. 8 is a flowchart illustrating a password generation method according to various embodiments.

FIG. 8 is a flowchart illustrating a password generation method of an electronic device according to various embodiments. Operations in FIG. 8 may be performed after operation 713 of FIG. 7.

Referring to FIG. 8, in an automatic password generation method, the electronic device 400 (e.g., the processor 410) may analyze (or extract) attribute information about content in operation 801. The attribute information may further include metadata or tag information about the content. The attribute information may vary depending on the type of content. The following table shows attribute information according to content types.

TABLE 1

| Content type | Attribute information about content |
|---|---|
| Image Files | Name, size, type (e.g., extension), generation date and time (date and time), location information, generation mode (e.g., camera mode), tab, album information, generation method (e.g., shooting with camera, download, capture, etc.), storage location |
| Video Files | Name, size, type (e.g., extension), generation date and time, location information, generation mode (e.g., camera mode), tab, album information, generation method (e.g., shooting with camera, downloading, capturing, etc.), play time, storage location |
| Sound Files | Name, size, generation date and time, play time, storage location, generation method (e.g., recording during a call, video recording, ring tone, notification sound, etc.) |
| Music Files | Name (e.g., title), size, artist name, album name, genre, play time, type (e.g., MP3 sound quality, lossless audio format, etc.), storage location |
| Document Files | Name, size, type (e.g., extension (.xlsx, .ppt, .doc, etc.)), generation date and time, modification date and time, storage location |
| Schedule | Name, generation date and time, meeting place, meeting date, meeting time, meeting participant, memo information, repetitiveness |

For example, referring to Table 1, text-type content (e.g., document files) may include at least one piece of attribute information among a name, a size, a type, a generation date and time, a modification date and time, or a storage location. Image-type content (e.g., image files) may include at least one piece of attribute information among a name, a size, a type (e.g., an extension), a generation date and time (date and time), location information, a generation mode (e.g., a camera mode), a tag, album information, a generation method (e.g., shooting with camera, downloading, or capturing), or storage location. Video-type content (e.g., video files) may include at least one piece of attribute information among a name, a size, a type (e.g., an extension), a generation date and time, location information, a generation mode (e.g., a camera mode), a tag, album information, a generation method (e.g., shooting with camera, downloading, or capturing), play time, or storage location. The processor 410 may use different pieces of attribute information to generate password information depending on the type of the executed content.

In operation 803, the electronic device 400 (e.g., the processor 410) may analyze (or obtain) context information about the electronic device 400. The context information may be information obtained from the electronic device 400 when generating (or obtaining) the content. For example, the context information may include at least one of a date, a time, a location, or a storage location. For example, when the content is downloaded, the context information may include at least one of a date on which the content is downloaded, a time at which the content is downloaded, and a storage location of the downloaded content. Alternatively, when the content is generated by the user, the context information may include at least one of a date on which the content is generated, a time at which the content is generated, a location (e.g., a geographical location) in which the content is generated, or a storage location of the generated content. According to various embodiments, since the attribute information about the content includes pieces of information obtained when the content is generated or obtained, some of the attribute information may be equivalent or similar to the context information about the electronic device 400. That is, the context information of the electronic device 400 may partially overlap the attribute information about the content. Alternatively, the context information may further include usage history information based on the usage history of the user.

In FIG. 8, the attribute information about the content is analyzed first and the context information about the electronic device 400 is analyzed. However, the context information about the electronic device 400 may be analyzed first, and the attribute information about the content may be analyzed. That is, operations 801 and 803 may be performed simultaneously or sequentially.

In operation 805, the electronic device 400 (e.g., the processor 410) may generate password information based on the attribute information about the content or the context information about the electronic device 400. The processor 410 may select attribute information to use for generating password information based on the type of the content. For example, when the type of the content is text, the processor 410 may generate password information using a name and a type (e.g., an extension). Alternatively, when the type of the content is an image, the processor 410 may generate password information using a name, a generation date and time, location information, or a generation method.

According to various embodiments, based on the type of the content, the processor 410 may generate password information only using the attribute information about the content or may generate password information using the attribute information about the content and the context information about the electronic device 400. For example, when the type of the content is text, the processor 410 may generate password information only using the attribute information about the content. When the type of the content is a sound, the processor 410 may generate password information using both the attribute information about the content and the context information about the electronic device 400. According to various embodiments, depending on user settings, the processor 410 may generate password information only using the attribute information about the content or may generate password information using the attribute information about the content and the context information about the electronic device 400.

According to various embodiments, the processor 410 may identify information significant to the user based on the usage history information included in the context information. The processor 410 may select at least one piece of attribute information significant to the user from among a plurality of pieces of content attribute information based on the significant information. Accordingly, the processor 410 may use part or all of the attribute information about the content to generate password information based on the usage history information.

In operation 807, the electronic device 400 (e.g., the processor 410) may display the generated password information. For example, the processor 410 may display the generated password information on the display 450. Here, the processor 410 may provide a user interface including various control buttons (or keys) associated with the password information together with the password information. For example, the user interface may include at least one of a confirm button, a regenerate button, or a manual input button (or a password input button). The confirm button may be selected to encrypt the content using the password information. The regenerate button may be for requesting the regeneration of different password information other than the generated password information. The manual input button may be selected when the user manually inputs password information. In addition, the user interface may further include a cancel button. The cancel button may be selected to terminate a content encryption process. The processor 410 may perform operation 809 when any one of the control buttons is selected.

In operation 809, the electronic device 400 (e.g., processor 410) may determine whether a request to regenerate a password is made. For example, the processor 410 may determine whether a password regeneration button is selected on the user interface including the password information and the control buttons (e.g., the confirm button, the regenerate button, and the manual input button).

When the request to regenerate the password is made, the processor 410 may return to operation 805; when no request to regenerate a password is made, the processor 410 may perform operation 811. For example, when the password regeneration button is selected, the processor 410 may return to operation 805 in order to regenerate a password. For example, the user may request different password information when the password information is inadequate. When returning to operation 805, the processor 410 may generate password information different from the previously generated password information.

When the password regeneration button is not selected, the electronic device 400 (e.g., the processor 410) may determine whether password input is selected in operation 811. For example, the processor 410 may determine whether the manual input button is selected on the user interface including the password information and the control buttons. For example, the user may select the manual input button when the password information is inadequate or when the user wants to directly input password information.

When manual input is requested, the processor 410 may perform operation 851; when a manual input is not requested, the processor 410 may perform operation 813. For example, when the manual input button is selected, the processor 410 may perform operation 851 for a manual password input process in which the user directly inputs password information. For example, the user may select the confirm button when the user wants to encrypt the content with the password information.

When manual input is not requested (e.g., the confirm button is selected), the electronic device 400 (e.g., the processor 410) may request the articulation of password information in operation 813. The processor 410 may lead the user to say the password information displayed in operation 807. For example, when the password information is "Us on December 25th", the processor 410 may display an articulation request message "Repeat Us on December 25th" on the display 450. The processor 410 may also output "Repeat Us on December 25th" as a sound through the speaker (e.g., the speaker 282).

In operation 815, the electronic device 400 (e.g., the processor 410) may receive voice information resulting from the articulation. The processor 410 may receive a voice input through a microphone (e.g., the microphone 288) from the user in operation 813. The processor 410 may perform signal processing on the input voice and may recognize the voice. According to various embodiments, the processor 410 may identify whether the recognized voice matches the voice of the user. For example, when the recognized voice matches the voice of the user, the processor 410 may use the voice information for content encryption.

When the recognized voice does not match the voice of the user, the processor 410 may display an error message (e.g., "Authentication has failed. Do voice input again.") on the display 450. After displaying the error message, the processor 410 may terminate the content encryption process. That is, the processor 410 may terminate without performing an operation of encrypting the content based on the voice information (e.g., operation 519 of FIG. 7). Alternatively, the processor 410 may perform operations 813 and 815 again according to the user's selection. According to various embodiments, the processor 410 may count the number of times the error message has been displayed, and may terminate the content encryption process regardless of the user's selection when the error message has been displayed a preset number of times (e.g., three times) or more.

When the password generation method is a manual password generation method (e.g., no) in operation 713 of FIG. 7 or when the manual input button is selected in operation 811 of FIG. 8, the electronic device 400 (e.g., the processor 410) may request voice input in operation 851. For example, the processor 410 may display a notification message (e.g., "Say a desired password") instructing the user to say a desired password on the display 450. The processor 410 may output the notification message requesting voice input via a microphone (e.g., the microphone 288).

In operation 853, the electronic device 400 (e.g., the processor 410) may detect a voice input. Operation 853 is equivalent or similar to operation 501 of FIG. 5 or operation 703 of FIG. 7, and thus a detailed description thereof will be omitted.

In operation 855, the electronic device 400 (e.g., the processor 410) may recognize a voice from the detected voice input. Operation 855 is equivalent or similar to operation 503 of FIG. 5 or operation 705 of FIG. 7, and thus a detailed description thereof will be omitted.

In operation 857, the electronic device 400 (e.g., the processor 410) may display password information recognized as the voice. For example, the processor 410 may display the password information in a text form relating to the recognized voice on the display 450. According to various embodiments, the processor 410 may provide a user interface including various control buttons (or keys) associated with the password information together with the password information. For example, the user interface may include at least one of a confirm button, a regenerate button, or an automatic password generation button (or an automatic generation button). The confirm button may be selected to encrypt the content using the password information. The regenerate button may be for requesting voice recognition again when the voice is wrongly recognized to be different from voice-input text by the user. The automatic password generation button may be selected by the user to automatically generate password information.

According to various embodiments, the user interface may further include a touch input button. The touch input button may be selected when the user wishes to directly input password information through an input device (e.g., a keypad). When the touch input button is selected, the processor 410 may provide the keypad on the display 450. Alternatively, the user interface may further include a cancel button. The cancel button may be selected to terminate a content encryption process. The processor 410 may perform operation 809 when any one of the control buttons is selected.

In operation 859, the electronic device 400 (e.g., processor 410) may determine whether a request to regenerate a password is made. For example, the processor 410 may determine whether a password regeneration button is selected on the user interface including the password information and the control buttons (e.g., the confirm button, the regenerate button, and the automatic password generation button).

When the request to regenerate the password is made, the processor 410 may return to operation 851; when no request to regenerate a password is made, the processor 410 may perform operation 861. For example, when the password regeneration button is selected, the processor 410 may return to operation 851 in order to perform voice recognition again. For example, the user may request re-performance of voice recognition when the password information is different from that the user said. When returning to operation 851, the processor 410 may request the user to input a voice again.

When the password regeneration button is not selected, the electronic device 400 (e.g., the processor 410) may determine whether automatic password generation is requested in operation 861. For example, the processor 410 may determine whether the automatic password generation button is selected on the user interface including the password information and the control buttons. The user may select the automatic password generation button when password information that the user wants is not properly recognized or when the user wants password information to be automatically generated.

When automatic password generation is requested, the processor 410 may perform operation 801; when automatic password generation is not requested, the processor 410 may perform operation 863. For example, when the automatic password generation button is selected, the processor 410 may perform operation 851 for an automatic password generation process in which the electronic device 400 automatically generates password information. For example, the user may select the confirm button when the user wants to encrypt the content with the password information.

When automatic password generation is not requested (e.g., the confirm button is selected), the electronic device 400 (e.g., the processor 410) may request the articulation of password information in operation 863. The processor 410 may lead the user to say the password information displayed in operation 807 out loud. Operation 863 is equivalent or similar to operation 813, and thus a detailed description thereof may be omitted.

In operation 865, the electronic device 400 (e.g., the processor 410) may receive voice information resulting from the articulation. The processor 410 may receive a voice input through a microphone (e.g., the microphone 288) from the user in operation 863. The processor 410 may perform signal processing on the input voice and may recognize the voice. According to various embodiments, the processor 410 may identify whether the recognized voice matches the voice of the user. For example, when the recognized voice matches the voice of the user, the processor 410 may use the voice information for content encryption. When the recognized voice does not match the voice of the user, the processor 410 may display an error message on the display 450. After displaying the error message, the processor 410 may terminate the content encryption process. Alternatively, the processor 410 may perform operations 813 and 815 again according to the user's selection. According to various embodiments, the processor 410 may terminate the content encryption process regardless of the user's selection when the error message has been displayed a preset number of times (e.g., three times) or more.

Figure 9:
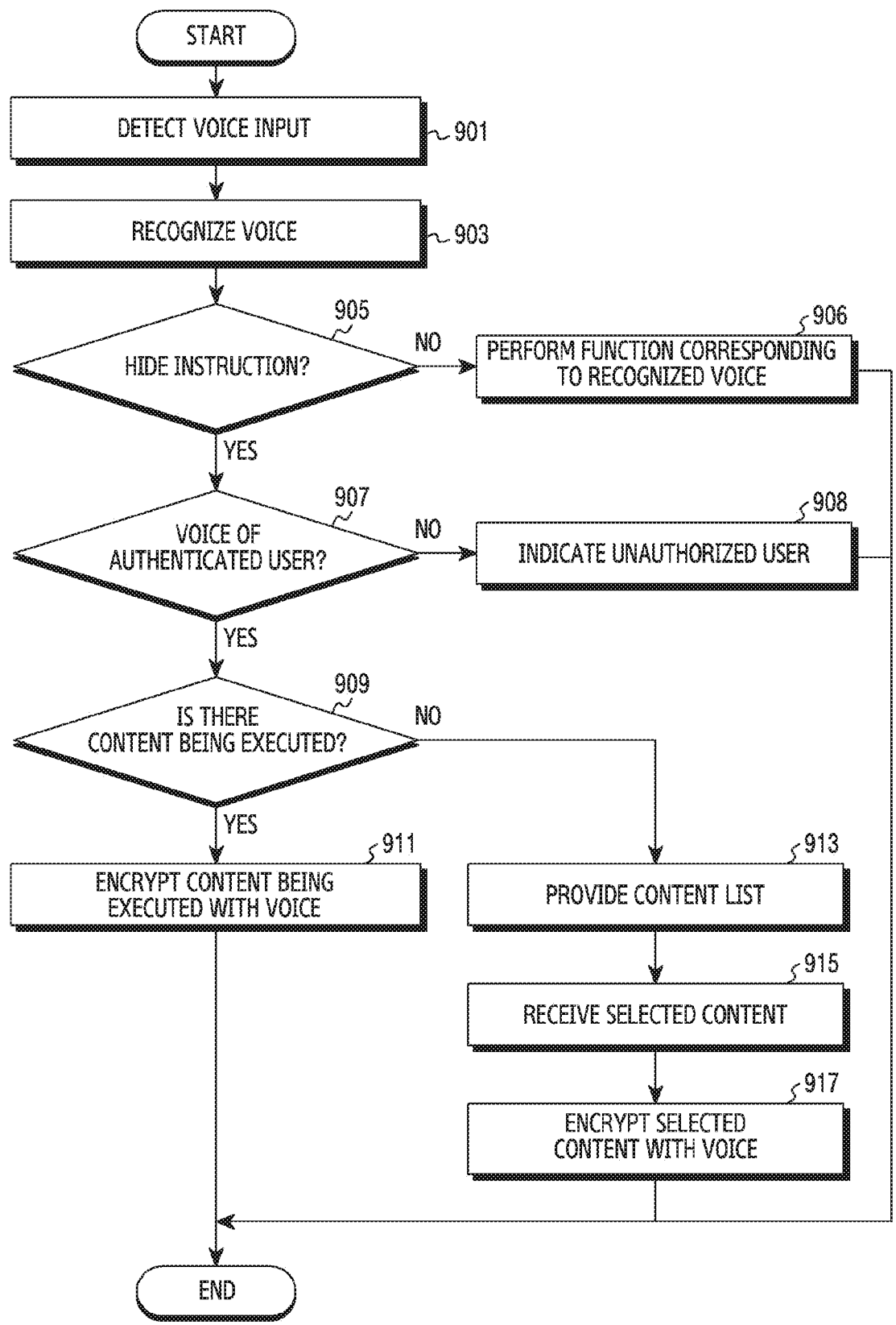
FIG. 9 is a flowchart illustrating a content encryption method according to various embodiments.

FIG. 9 is a flowchart illustrating a content encryption method of an electronic device according to various embodiments. FIG. 9 illustrates a scenario that may be performed when the display 450 of the electronic device 400 is turned off.

Referring to FIG. 9, the electronic device 400 (e.g., the processor 410) may detect a voice input in operation 901. Operation 901 is equivalent or similar to operation 501 of FIG. 5 or operation 703 of FIG. 7, and thus a detailed description thereof will be omitted.

In operation 903, the electronic device 400 (e.g., the processor 410) may recognize a voice from the detected voice input. Operation 903 is equivalent or similar to operation 503 of FIG. 5 or operation 705 of FIG. 7, and thus a detailed description thereof will be omitted.

In operation 905, the electronic device 400 (e.g., processor 410) may determine whether the recognized voice includes a hide instruction. The hide instruction may be a command to request the encryption of content so that the content is not shown to a non-user. The processor 410 may determine whether the recognized voice corresponds to a hide instruction stored in the memory 440. According to various embodiments, voice information input with the display turned on in FIG. 5 and FIG. 7 and voice information input with the display turned off in FIG. 9 may be the same or different. For example, the voice information input with the display turned on may include a demonstrative pronoun indicating content to be encrypted. For example, the voice information input with the display turned on may include a demonstrative pronoun, such as "Hide this picture" and "This is secure". The voice information input with the display turned off may not include a demonstrative pronoun. When the display is turned off, the user cannot know which content is running and thus may not include a demonstrative pronoun.

When at least part of the recognized voice corresponds to the hide instruction, the processor 410 may perform operation 907. When at least part of the recognized voice does not correspond to the hide instruction, the processor 410 may perform operation 906.

In operation 906, the electronic device 400 (e.g., the processor 410) may perform a function corresponding to the recognized voice. According to various embodiments, the processor 410 may provide various functions (or services) corresponding to the recognized voice using voice recognition technology. For example, when the recognized voice is "Harry Portter", the processor 410 may execute an Internet application and may provide search results for Harry Portter.

In operation 907, the electronic device 400 (e.g., the processor 410) may determine whether the recognized voice (or the detected voice input) is the voice of an authenticated user. The voice of the authenticated user may refer to a user who owns the electronic device 400. The processor 410 may extract a particular frequency from the voice signal and may determine whether the extracted frequency corresponds to a user-specific voice frequency stored in the memory 440. Operation 907 is equivalent or similar to operation 709 of FIG. 7, and thus a detailed description thereof will be omitted.

When the recognized voice matches the voice of the authenticated user, the processor 410 may perform operation 909. When the recognized voice does not match the voice of the authenticated user, the processor 410 may perform operation 908.

In operation 908, the electronic device 400 (e.g., the processor 410) may report that the recognized voice is an unauthenticated user. The processor 410 (e.g., the speaker recognizer 415) may indicate that the recognized voice is not the user of the electronic device 400. Alternatively, when the recognized voice does not match the voice frequency stored in the memory 440, the processor 410 may request the user to re-input a voice. Alternatively, since the recognized voice does not match the voice frequency stored in the memory 440, the processor 410 may indicate that a content encryption process cannot be performed. Operation 908 is equivalent or similar to operation 710 of FIG. 7, and thus a detailed description thereof will be omitted.

In operation 909, the electronic device 400 (e.g., the processor 410) may determine whether there is content being executed. For example, with the display 450 turned off, the processor 410 may determine whether there is content being executed on the electronic device 400. For example, the processor 410 may determine whether there is content that has been executed last before the display 450 is turned off. There may be one or more pieces of content executed last. Alternatively, the processor 410 may determine whether there is content executed in the foreground before the display 450 is turned off.

When there is content being executed, the processor 410 may perform operation 911; when there is no content being executed, the processor 410 may perform operation 913.

When there is content being executed, the electronic device 400 (e.g., the processor 410) may encrypt the content being executed with a voice in operation 911. For example, the processor 410 may encrypt the content with the voice recognized in operation 903. The processor 410 may encrypt all content executed last with the voice recognized in operation 903. Alternatively, the processor 410 may encrypt one piece of content being displayed on at least a portion of the display with the voice recognized in operation 903. When the turned-off display 450 is turned on by another person, the user may encrypt last used content with a voice by simply saying "Hide", being concerned about the exposure of the last used content.

When there is no content being executed, the electronic device 400 (e.g., the processor 410) may provide a content list in operation 913. For example, the processor 410 may display a list of any content that can be encrypted with a voice password on the display 450. Here, the processor 410 may turn on the display 450 to provide the content list.

In operation 915, the electronic device 400 (e.g., the processor 410) may receive at least one piece of content selected by the user from the content list. The processor 410 may provide a check box for each piece of content to receive at least one piece of content selected by the user. The user may select a plurality of pieces of content by selecting one piece of content and then dragging therefrom. The processor 410 may select all pieces of content that exist from the point where a touch is detected (e.g., a start point) to the point where the touch is released (e.g., an end point).

In operation 917, the electronic device 400 (e.g., the processor 410) may encrypt the selected content with a voice. For example, the processor 410 may encrypt the selected content with the voice recognized in operation 903.

According to various embodiments, when there is no content being executed, the processor 410 may terminate without performing a content encryption process. That is, when there is no content being executed, the processor 410 may terminate without performing operations 913 to 917.

Figure 10:
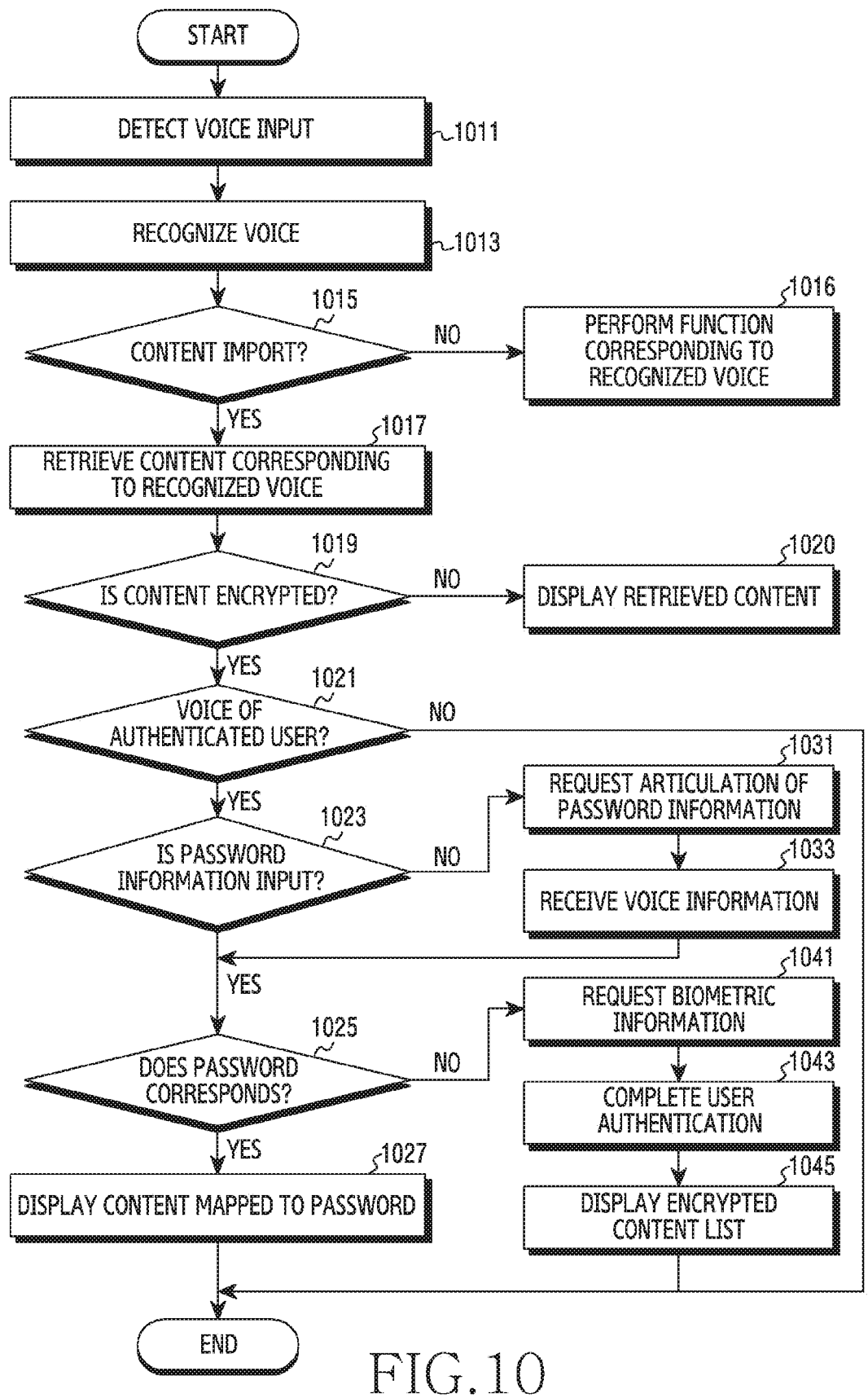
FIG. 10 is a flowchart illustrating a hidden content providing method of an electronic device according to various embodiments.

FIG. 10 is a flowchart illustrating a hidden content providing method of an electronic device according to various embodiments.

Referring to FIG. 10, the electronic device 400 (e.g., the processor 410) may detect a voice input in operation 1011. Operation 1011 is equivalent or similar to operation 501 of FIG. 5 or operation 703 of FIG. 7, and thus a detailed description thereof will be omitted.

In operation 1013, the electronic device 400 (e.g., the processor 410) may recognize a voice from the detected voice input. Operation 1013 is equivalent or similar to operation 503 of FIG. 5 or operation 705 of FIG. 7, and thus a detailed description thereof will be omitted.

In operation 1015, the electronic device 400 (e.g., the processor 410) may determine whether the recognized voice is a content import command. For example, the processor 410 may determine whether text corresponding to the recognized voice is mapped to a name associated with content or a content type (e.g., a picture, a document, a video, or the like) or includes an import instruction, such as "Show me". When the recognized voice includes a content import instruction, the processor 140 may determine that the user has spoken with intent to see content.

When the recognized voice (e.g., text information) is a content import instruction, the processor 140 may perform operation 1017; when the recognized voice is not a content import instruction, the processor 140 may perform operation 1016.

In operation 1016, the electronic device 400 (e.g., the processor 410) may perform a function corresponding to the recognized voice. Operation 1016 is equivalent or similar to operation 506 of FIG. 5 or operation 708 of FIG. 7, and thus a detailed description thereof will be omitted.

In operation 1017, the electronic device 400 (e.g., the processor 410) may retrieve content corresponding to the recognized voice. The processor 410 may retrieve from the memory 440 whether there is content with a name corresponding to part or the entirety of the recognized voice or there is a content of a type corresponding to part or the entirety of the recognized voice.

In operation 1019, the electronic device 400 (e.g., the processor 410) may determine whether the retrieved content is encrypted. The processor 410 may determine whether the retrieved content is encrypted with a voice password or a password. The processor 410 may determine only whether there is content encrypted with a voice password.

When the retrieved content is encrypted, the processor 410 may perform operation 1021; when the retrieved content is not encrypted, the processor 410 may perform operation 1020.

When the retrieved content is not encrypted, the electronic device 400 (e.g., the processor 410) may provide the retrieved content in operation 1020. For example, the processor 410 may display the retrieved content or a content list including the retrieved content on the display 450. For example, when the user inputs a voice "Show me the picture" in operation 1011, the processor 410 may execute a gallery application and may display a picture list on the display 450.

When the retrieved content is encrypted, the electronic device 400 (e.g., the processor 410) may determine whether the recognized voice is the voice of an authenticated user in operation 1021. The processor 410 may extract a particular frequency from the voice signal and may determine whether the extracted frequency corresponds to a user-specific voice frequency stored in the memory 440. Operation 1021 is equivalent or similar to operation 907, and thus a detailed description thereof will be omitted.

When the recognized voice matches the voice of the authenticated user, the processor 410 may perform operation 1023. When the recognized voice does not match the voice of the authenticated user, the processor 410 may terminate. For example, the processor 410 (e.g., the speaker recognizer 415) may display an error message indicating that the recognized voice is not the user of the electronic device 400 and may then terminate. When the recognized voice does not match the voice of the authenticated user, the processor 410 may perform operation 1041. For example, the processor 410 may terminate or may perform operation 1041 depending on the configuration of the electronic device 400 or user settings, which may be simply modified in design and may vary depending on the configuration.

In operation 1023, the electronic device 400 (e.g., the processor 410) may determine whether password information is input. The processor 410 may determine whether the user imports content along with password information in operation 1011. For example, when voice information recognized in operation 1013 is "Show me a Yeouido nighttime image", the processor 410 may interpret "show me" or "image" as a content import command and may interpret "Yeouido nighttime" or "Yeouido nighttime image" as password information. To this end, a word corresponding to the content import command may be stored in the memory 440, and the processor 410 may determine voice information other than the content import command among the voice information as the password information.

When the password information is input, the processor 410 may perform operation 1025; when no password information is input, the processor 410 may perform operation 1031.

When no password information is input, the electronic device 400 (e.g., the processor 410) may request the articulation of password information in operation 1031. For example, when the user does not say password information in operation 1011, the processor 410 may perform operation 1031. The processor 410 may display an articulation request message "Say any desired password to content" on the display 450. Alternatively, the processor 410 may output a sound corresponding to the articulation request message through a speaker.

In operation 1033, the electronic device 400 (e.g., the processor 410) may receive voice information resulting from the articulation request. When the voice information is received, the processor 410 may determine whether the received voice information matches voice information resulting from the encryption of the content in operation 1025.

When the password information is input, the electronic device 400 (e.g., the processor 410) may determine whether the password information matches the password in operation 1025. For example, the processor 410 may determine whether text information corresponding to the voice information matches password information stored in the memory 440. Since the voice of the user is identified in operation 1021, it may be determined whether the password information in a text form matches the password information in operation 1025. That is, the processor 410 may convert voice information recognized as a voice into a text form and may compare two pieces of password information in the text form. Alternatively, the processor 410 may determine whether voice information corresponding to the password information in the memory 440 matches voice information obtained in operation 1013. That is, the processor 410 may compare two pieces of password information in a voice form.

When the password information matches the password, the electronic device 400 (e.g., the processor 410) may display content mapped to the password in operation 1027. According to various embodiments, the processor 410 may display content mapped to the two pieces of password information in the voice form that exactly match each other. Alternatively, when the voice of the authenticated user is identified and part of the password information in the text form matches the password, the processor 410 may display content mapped to the password information. Alternatively, when the voice of the authenticated user is identified and a set proportion (e.g., 70%) or greater of the password information in the text form matches the password, the processor 410 may display the content mapped to the password information.

When the password information does not match the password, the electronic device 400 (e.g., the processor 410) may request biometric information from the user in operation 1041. When the user that performs the input in operation 1011 is the authenticated user but the password information does not match the password, the processor 410 may request biometric information. That is, the user cannot remember the password information used to encrypt the content. In this case, the processor 410 may request biometric information and may activate a biometric recognition sensor (e.g., a fingerprint recognition sensor or an iris recognition sensor) in order to recognize biometric information. The processor 410 may display a notification message "Scan your fingerprint" or may display a position where a fingerprint recognition sensor is provided (e.g., a home button) and may activate the fingerprint recognition sensor. The processor 410 may display the notification message at the position where the fingerprint recognition sensor is provided. Alternatively, the processor 410 may display a notification message "Scan your iris" or may display a position where an iris recognition sensor is provided (e.g., an upper camera of the electronic device) and may activate the iris recognition sensor. The processor 410 may display the notification message at the position where the iris recognition sensor is provided.

According to various embodiments, the processor 410 may provide a user interface for selecting biometric information to be recognized. The user interface may include a button for selecting a body part to be recognized, such as a fingerprint recognition button, an iris recognition button, and a face recognition button, along with a notification message (e.g., Select a body part). The processor 410 may activate a recognition sensor selected by the user and may display a user interface associated with the activated recognition sensor. For example, the user interface may include a notification message (e.g., Scan your fingerprint), a recognition sensor position indicator (e.g., an arrow indicating the position of a recognition sensor), and a confirm button.

In operation 1043, the electronic device 400 (e.g., the processor 410) may complete user authentication. The processor 410 may obtain biometric information about a fingerprint, an iris, and a face from the user by requesting biometric information and may determine whether the obtained biometric information matches biometric information stored in the memory 440. When the obtained biometric information matches the biometric information stored in the memory 440, the processor 410 may complete user authentication. When the obtained biometric information does not match the biometric information stored in the memory 440, the processor 410 may terminate. Alternatively, when the obtained biometric information does not match the biometric information stored in the memory 440, the processor 410 may re-request biometric information. The processor 410 may count the number of times biometric information is re-requested and may terminate without re-requesting biometric information when the number of re-request times is a preset number of times or greater.

In operation 1045, the electronic device 400 (e.g., the processor 410) may display an encrypted content list. When the user that performs the input in operation 1011 is the authenticated user but the password information does not match the password, the processor 410 may further identify the biometric information, and may provide encrypted content when the biometric information matches the biometric information stored in the memory 440, thereby enhancing security. That is, when the user cannot remember the password information used to encrypt the content, the user may identify the encrypted content using the biometric information. The content list may include content mapped to only some of pieces of recognized password information that match each other or may include all encrypted content.

Figure 11A:
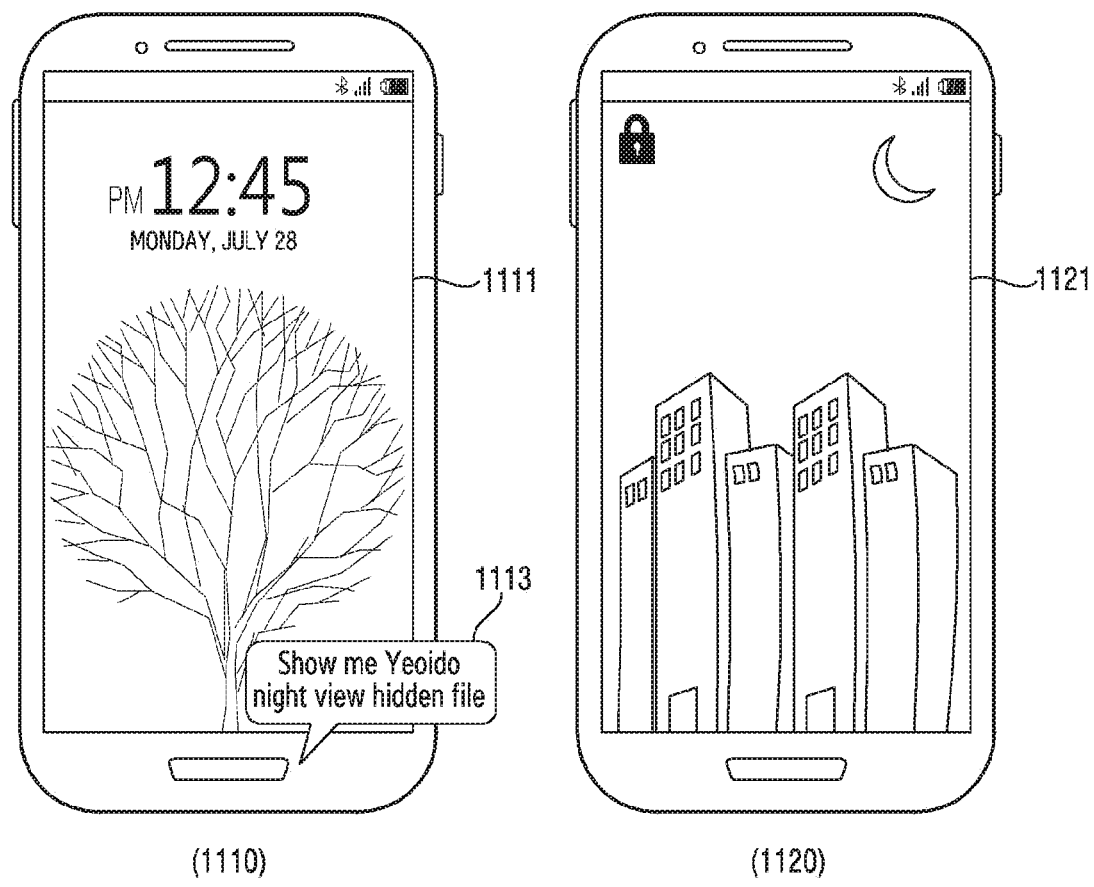
FIG. 11A and FIG. 11B illustrate a user interface for providing hidden content according to various embodiments.
Figure 11B:
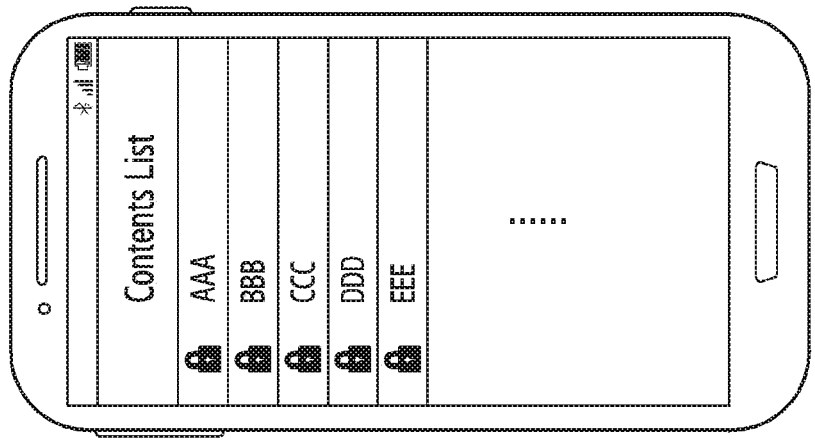
Figure 11B:
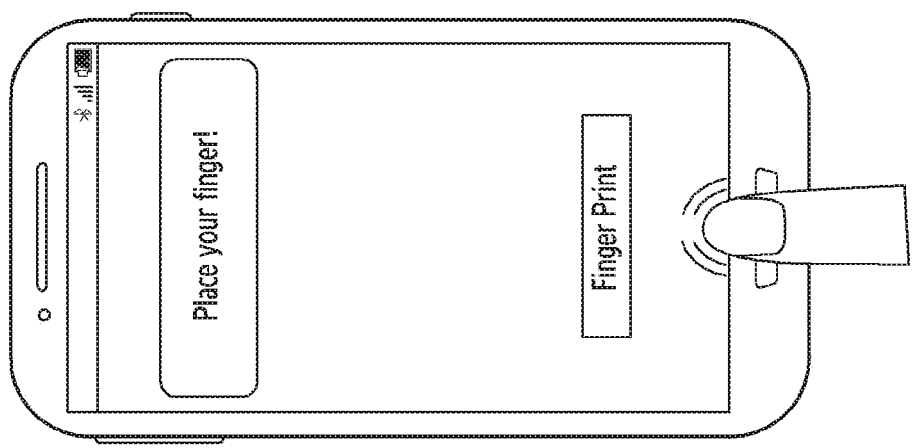
Figure 11B:
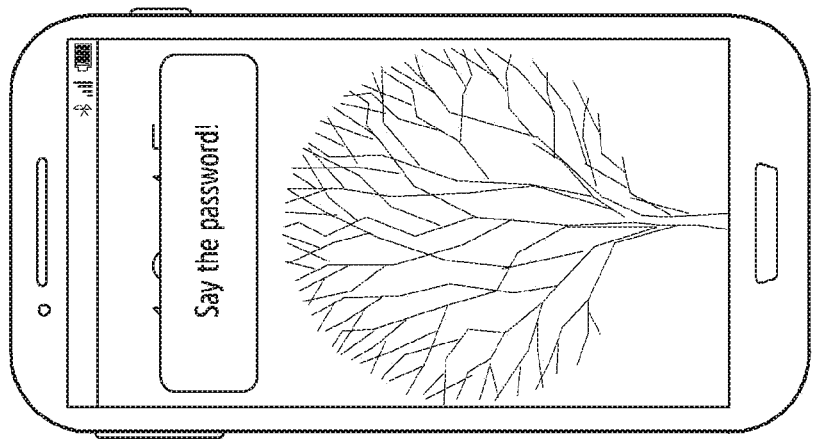

FIG. 11A and FIG. 11B illustrate a user interface for providing hidden content according to various embodiments.

FIG. 11A illustrates an example in which hidden content is provided when a user says password information.

Referring to FIG. 11A, the electronic device 400 (e.g., the processor 410) may receive a voice input 1113 from the user. When receiving the voice input 1113, the electronic device 400 may be in a home screen display state, a lock state, or an application execution state. When receiving the voice input 1113, a first user interface 1110 may be in a state of displaying a home screen 1111. The processor 410 may determine whether the voice command 1113 is a content import command. For example, voice input 1113 may include a content import command (e.g., "Show me") or a content name (e.g., "Yeoido night view hidden file"). When text corresponding to the voice input 1113 includes a content import instruction (e.g., "Show me"), the processor 410 may determine that the user has spoken with intent to see content. The processor 410 may retrieve content based on text information (e.g., "Yeoido night view hidden file") excluding the content import instruction.

The processor 410 may determine whether retrieved content is encrypted, and may determine whether the voice of the user that has performed the voice input 1113 is the voice of an authenticated user when the retrieved content is encrypted. The processor 410 may extract a particular frequency from a voice signal corresponding to the voice input 1113 and may determine whether the extracted frequency corresponds to a user-specific voice frequency stored in the memory 440. When the voice of the user that has performed the voice input 1113 matches the voice of the authenticated user, the processor 410 may determine whether the voice input 1113 includes password information. For example, the processor 410 may interpret "Show me" in the text information corresponding to the voice input 1113 as a content import command and may interpret "Yeoido night view", "Yeoido night view hidden", or "Yeoido night view hidden file" as password information. The processor 410 may determine whether a password for the text information corresponding to the voice input 1113 matches password information stored in the memory 440. When the password information included in the voice input 1113 matches the password information stored in the memory 440, the processor 410 may provide content 1121 corresponding to the password information. The processor 410 may display a second user interface 1120 including the content 1121 on the display 450.

FIG. 11B illustrates an example in which a hidden content list is provided when user authentication is completed.

Referring to FIG. 11B, when password information is not included in a voice input from the user requesting hidden content, the electronic device 400 (e.g., the processor 410) may request the user to say password information. For example, the processor 410 may display a third user interface 1130 including a notification message (e.g., "Say the password!") on the display 450. The processor 410 may also output the notification message (e.g., "Say the password!") as a sound via a speaker (e.g., the speaker 282). The processor 410 may receive a voice including password information from the user via the third user interface 1130. When the password information included in the received voice does not match password information stored in the memory 440, the processor 410 may request biometric information from the user.

For example, the processor 410 may display a fourth user interface 1140 including a notification message (e.g., "Place your finger!") on the display 450. Here, the processor 410 may display a position where a fingerprint recognition sensor is provided (e.g., a home button) and may activate the fingerprint recognition sensor. Further, the processor 410 may output the notification message (e.g., "Place your finger!") as a sound via the speaker (e.g., the speaker 282). When user authentication is completed through the fourth user interface 1140, the processor 410 may display an encrypted content list. For example, the processor 410 may display a fifth user interface 1150 including a content name (e.g., AAA, BBB, and the like) on the content list and an encryption image (e.g., a lock icon) to indicate that content is encrypted on the display 460.

Figure 12:
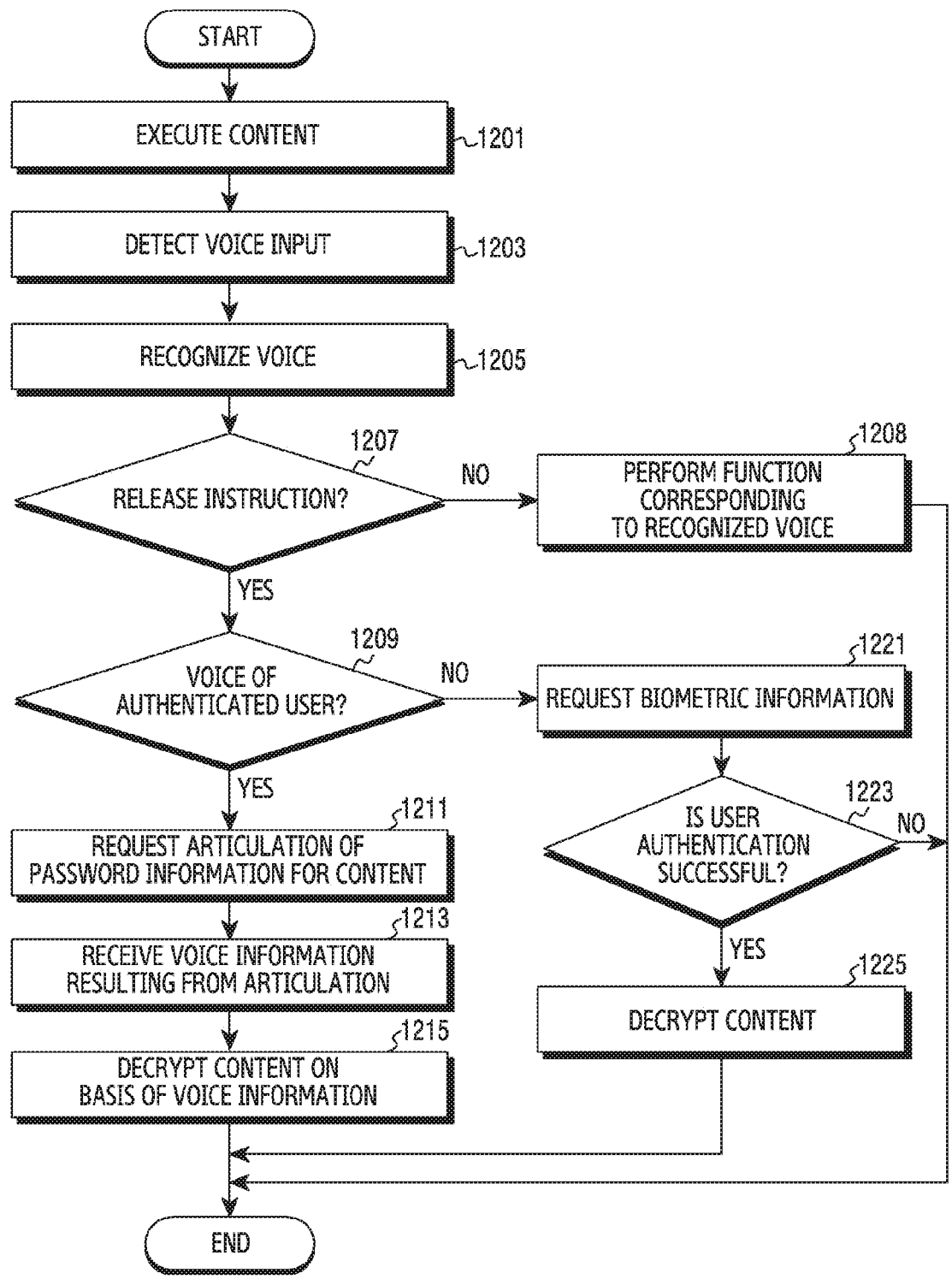
FIG. 12 is a flowchart illustrating a content decryption method of an electronic device according to various embodiments.

FIG. 12 is a flowchart illustrating a content decryption method of an electronic device according to various embodiments.

Referring to FIG. 12, in operation 1201, the electronic device 400 (e.g., the processor 410) may execute content. The processor 410 may execute the content by a command of the user. The content may be encrypted content or non-encrypted content. For example, the processor 410 may display the executed content on the display 450.

In operation 1203, the electronic device 400 (e.g., the processor 410) may detect a voice input. Operation 1203 is equivalent or similar to operation 501 of FIG. 5 or operation 703 of FIG. 7, and thus a detailed description thereof will be omitted.

In operation 1205, the electronic device 400 (e.g., the processor 410) may recognize a voice from the detected voice input. Operation 1205 is equivalent or similar to operation 503 of FIG. 5 or operation 705 of FIG. 7, and thus a detailed description thereof will be omitted.

In operation 1207, the electronic device 400 (e.g., the processor 410) may determine whether the recognized voice includes a release instruction (e.g., an unlock instruction or a decrypt instruction). When the recognized voice includes a release instruction, the processor 410 may determine that the user has spoken with intent to release encrypted content. The release instruction may be a command to request the release of encrypted content so that the content is shown to a non-user. For example, the release instruction may include a word, such as "release", "unlock", "declassify", "decrypt", or "disable security". A word for the release instruction may be stored in advance in the memory 440. The processor 410 (e.g., the voice encryption processor 413) may determine whether text converted from the voice corresponds to the release instruction stored in the memory 440.

When at least part of text information converted from the voice corresponds to the release instruction, the processor 410 may perform operation 1209. When at least part of the text information converted from the voice does not correspond to the release instruction, the processor 410 may perform operation 1208.

In operation 1208, the electronic device 400 (e.g., the processor 410) may perform a function corresponding to the recognized voice. Operation 1208 is equivalent or similar to operation 1016, and thus a detailed description may be omitted.

In operation 1209, the electronic device 400 (e.g., the processor 410) may determine whether the recognized voice (or the detected voice input) is the voice of an authenticated user. The processor 410 may extract a particular frequency from the voice signal and may determine whether the extracted frequency corresponds to a user-specific voice frequency stored in memory 440. Operation 1209 is equivalent or similar to operation 1021, and thus a detailed description will be omitted.

When the recognized voice corresponds to the voice of the authenticated user, the processor 410 may perform operation 1211. When the recognized voice does not correspond to the voice of the authenticated user, the processor 410 may perform operation 1221.

In operation 1211, the electronic device 400 (e.g., the processor 410) may request the articulation of password information for the content. The processor 410 may request the user to perform articulation of reading the password information out loud once more in order to decrypt the encrypted content with a password. This operation is for improving security by requesting a password once again when decrypting the content with the password. For example, the processor 410 may display an articulation request message "Say the password information out loud" on the display 450. Alternatively, the processor 410 may output the articulation request message through a speaker.

In operation 1213, the electronic device 400 (e.g., the processor 410) may receive voice information resulting from the articulation. The processor 410 may receive a voice input through a microphone (e.g., the microphone 288) from the user in operation 1111. The processor 410 may perform signal processing on the input voice and may recognize the voice. According to various embodiments, the processor 410 may identify whether the recognized voice matches the voice of the user. Operation 1113 is equivalent or similar to operation 865, and thus a detailed description may be omitted.

In operation 1215, the electronic device 400 (e.g., the processor 410) may decrypt the content with the password based on the voice information. For example, when the recognized voice matches the voice of the user and the voice information is the same as voice information corresponding to the password information stored in the memory 440, the processor 410 decrypts the encrypted content with the password. That is, the user may decrypt the encrypted content with the password by the same method as used for encrypting the content. That is, the processor 410 may decrypt the content executed in operation 1101 with the password. When the content is decrypted with the password, the processor 410 may display the result of decryption. For example, the processor 410 may delete a lock image (e.g., a lock icon) displayed along with the content, thereby not displaying the lock image along with the content.

When the recognized voice is not the voice of the authenticated user, the electronic device 400 (e.g., the processor 410) may request biometric information from the user in operation 1221. When the user that performs the input in operation 1103 is not an authenticated user, the processor 410 may request biometric information. For example, although the user that performs the input in operation 1103 is the user that owns the electronic device 400, it may be determined that the user that performs the input in operation 1103 is not an authenticated user due to an error in the electronic device 400 (e.g., a voice recognition error). In this case, the processor 410 may request biometric information and may activate a biometric recognition sensor (e.g., a fingerprint recognition sensor or an iris recognition sensor) in order to receive biometric information from the user. Operation 1121 is equivalent or similar to operation 1041, and thus a detailed description may be omitted.

In operation 1223, the electronic device 400 (e.g., the processor 410) may determine whether user authentication is successful. The processor 410 may obtain biometric information about a fingerprint, an iris, and a face from the user by requesting biometric information and may determine whether the obtained biometric information matches biometric information stored in the memory 440. When the obtained biometric information matches the biometric information stored in the memory 440, the processor 410 may determine that user authentication is successful and may complete biometric information authentication. However, when the obtained biometric information does not match the biometric information stored in the memory 440, the processor 410 may terminate. Alternatively, when the obtained biometric information does not match the biometric information stored in the memory 440, the processor 410 may re-request biometric information. For example, the processor 410 may count the number of biometric authentication times, and may terminate without re-requesting biometric information any more when the number of counted biometric authentication times is a preset number of times (e.g., three times) or greater.

In operation 1225, the electronic device 400 (e.g., the processor 410) may decrypt the content with the password. For example, when decrypting the content with the password is requested by a voice recognition error or content decryption by a non-user, the processor 410 may further identify biometric information, and may decrypt the content with the password when the biometric information corresponds, thereby enhancing security. That is, the user may decrypt the encrypted content with the password using the biometric information. The processor 410 may decrypt the content executed in operation 1101 with the password.

Although FIG. 12 illustrates the decryption method, a method of deleting encrypted content may also be equivalent or similar to the decryption method.

An operating method of an electronic device 400 including a voice recognizer 411 according to various embodiments may include: recognizing voice information about a user using the voice recognizer; obtaining password information about content selected by the user when the recognized voice information includes a hide instruction; requesting the user to articulate the obtained password information; and encrypting the content based on voice information received according to the request.

The obtaining may include determining whether the voice information is a voice of an authenticated user and generating the password information when the voice information is the voice of the authenticated user.

The generating may include generating the password information based on attribute information about the content or context information about the electronic device.

The obtaining may include receiving the password information input from the user.

The method may further include storing the password information and voice information corresponding to the password information in association with the content in a memory 440 of the electronic device.

The method may further include requesting articulation of password information associated with encrypted content when the voice information recognized by the voice recognizer is an encrypted content import instruction, and providing the encrypted content by determining whether the voice information received according to the request is the same as password information stored in the memory.

The providing of the encrypted content may include providing the encrypted content when the voice information received according to the request is the same as voice information corresponding to the password information stored in the memory.

The providing of the encrypted content may include requesting biometric authentication when text information of the voice information received according to the request is not the same as the password information stored in the memory, obtaining biometric information about the user using a biometric recognition sensor 430 of the electronic device in response to the request, and providing the encrypted content when the obtained biometric information is the same as biometric information stored in the memory.

A computer-readable recording medium according to various embodiments may include a program to implement: an operation of recognizing a voice using a voice recognizer; an operation of obtaining password information about content selected by a user according to a password generation method when the recognized voice information includes a hide instruction; an operation of requesting the user to articulate the obtained password information; and an operation of encrypting the content based on voice information received according to the request.

The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a compiler or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

Meanwhile, although the concrete embodiments of the disclosure have been described in the detailed description of the disclosure, various modifications can be made without departing from the scope of the disclosure. Therefore, the scope of the disclosure should not be limited to the aforementioned embodiments, but should be defined by equivalents to the appended claims as well as the claims.

What is claimed is:

1. An electronic device comprising:
a voice recognizer;
a memory;
a display; and
a processor operably connected to the voice recognizer, the memory, or the display,
wherein the processor is configured to:
  recognize a hide instruction uttered by a user of the electronic device,
wherein the hide instruction is for hiding content,
  determine whether the user who utters the hide instruction is an authenticated user by using the voice recognizer,
  when the user is the authenticated user, provide a list of contents possible to hide on the display,
  generate password information about content selected by a user among the list of contents, wherein the password information about the selected content is automatically generated based on at least one of a geographical generation location of the selected content, a generation time of the selected content, or a user's usage history information for the electronic device,
  request the user to articulate the generated password information displayed on the display,
  obtain voice information of the user when the user articulates the generated password information,
  store the password information and the voice information corresponding to the password information in association with the selected content, and
  hide the selected content on the display, and
wherein the password information and the voice information associated with the selected content are used for providing the hidden content to the user.

2. The electronic device of claim 1, wherein the processor is further configured to determine whether the voice information is a voice of an authenticated user, and to generate the password information when the voice information is the voice of the authenticated user.

3. The electronic device of claim 1, wherein the processor is further configured to generate the password information based on at least one piece of information associated with the selected content.

4. The electronic device of claim 1, wherein the processor is further configured to generate the password information based on attribute information about the content or context information about the electronic device.

5. The electronic device of claim 1, wherein the processor is further configured to receive the password information input from the user.

6. The electronic device of claim 1, wherein, when the voice information recognized by the voice recognizer is a hidden content import instruction, the processor is further configured to:
request articulation of password information associated with the hidden content,
determine whether the voice information received according to the request is the same as password information stored in the memory, and
provide the hidden content.

7. The electronic device of claim 6, wherein the processor is further configured to provide the hidden content when the voice information received according to the request is the same as voice information corresponding to the password information stored in the memory.

8. The electronic device of claim 6, further comprising a biometric recognition sensor,
wherein the processor is further configured to provide the hidden content through biometric information authentication using the biometric recognition sensor when text information of the voice information received according to the request is not the same as the password information stored in the memory.

9. The electronic device of claim 1, wherein, when the voice information recognized by the voice recognizer comprises a content import instruction, the processor is further configured to:
retrieve content stored in the memory,
determine whether the retrieved content is encrypted,
request articulation of password information associated with the retrieved content when the retrieved content is encrypted,
determine whether the voice information received according to the request is the same as password information stored in the memory, and
provide the retrieved content.

10. The electronic device of claim 1, wherein, when the voice information recognized by the voice recognizer is a hidden content release instruction, the processor is further configured to:
request articulation of password information associated with the hidden content,
determine whether the voice information received according to the request is the same as password information stored in the memory, and
decrypt the hidden content with a password.

11. The electronic device of claim 10, further comprising a biometric recognition sensor,
wherein the processor is further configured to decrypt the hidden content with the password through biometric information authentication using the biometric recognition sensor when text information of the voice information received according to the request is not the same as the password information stored in the memory.

12. An operating method of an electronic device comprising a voice recognizer, the method comprising:
recognizing a hide instruction uttered by a user the electronic device, wherein the hide instruction is for hiding content;
determining whether the user who utters the hide instruction is an authenticated user by using the voice recognizer;
when the user is the authenticated user, providing a list of contents possible to hide on a display;
generating password information about content selected by the user among the list of contents, wherein the password information about the selected content is automatically generated based on at least one of a geographical generation location of the selected content, a generation time of the selected content, or a user's usage history information for the electronic device;
requesting the user to articulate the generated password information displayed on the display;
obtaining voice information of the user when the user articulates the generated password information;
storing the password information and the voice information corresponding to the password information in association with the selected content; and
hiding the selected content on the display,
wherein the password information and the voice information associated with the selected content are used for providing the hidden content to the user.

13. The method of claim 12, wherein the obtaining comprises determining whether the voice information is a voice of an authenticated user and generating the password information when the voice information is the voice of the authenticated user.

14. The method of claim 13, wherein the generating comprises generating the password information based on attribute information about the content or context information about the electronic device.

15. The method of claim 12, wherein the obtaining comprises receiving the password information input from the user.

16. The method of claim 12, further comprising:
when the voice information recognized by the voice recognizer is a hidden content import instruction, requesting articulation of password information associated with the hidden content;
determining whether the voice information received according to the request is the same as password information stored in memory; and
providing the hidden content.

17. The method of claim 16, wherein the providing of the hidden content comprises providing the hidden content when the voice information received according to the request is the same as voice information corresponding to the password information stored in the memory.

18. The method of claim 16, wherein the providing of the hidden content comprises:
requesting a biometric authentication when text information of the voice information received according to the request is not the same as the password information stored in the memory;
obtaining biometric information about the user using a biometric recognition sensor of the electronic device in response to the request; and
providing the hidden content when the obtained biometric information is the same as biometric information stored in the memory.

* * * * *